(12) United States Patent
Yoneyama et al.

(10) Patent No.: US 8,896,802 B2
(45) Date of Patent: Nov. 25, 2014

(54) LIGHT TRANSMISSIVE SUBSTRATE, METHOD OF MAKING TRANSMISSIVE SUBSTRATE, SURFACE LIGHT SOURCE UNIT, POLARIZING PLATE, AND LIQUID CRYSTAL DEVICE

(75) Inventors: Hiroyuki Yoneyama, Kanagawa (JP); Yasuyuki Sasada, Kanagawa (JP); Yujiro Yanai, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 671 days.

(21) Appl. No.: 12/923,508

(22) Filed: Sep. 24, 2010

(65) Prior Publication Data
US 2011/0075075 A1   Mar. 31, 2011

(30) Foreign Application Priority Data

Sep. 30, 2009 (JP) ................................. 2009-229024

(51) Int. Cl.
G02F 1/13 (2006.01)
G02F 1/1335 (2006.01)

(52) U.S. Cl.
CPC ..... *G02F 1/133611* (2013.01); *B32B 2457/202* (2013.01); *G02F 1/133604* (2013.01); *G02F 2001/133607* (2013.01)
USPC ............... 349/187; 349/64; 349/95; 359/619; 359/620

(58) Field of Classification Search
USPC ........................................ 349/64, 95–96, 187
See application file for complete search history.

(56) References Cited

U.S. PATENT DOCUMENTS

| 2003/0169504 A1* | 9/2003 | Kaminsky et al. ............. 359/622 |
| 2004/0052977 A1* | 3/2004 | Ogawa et al. ................... 428/1.1 |
| 2007/0019133 A1* | 1/2007 | Umeda et al. .................... 349/96 |
| 2007/0171671 A1 | 7/2007 | Kurokawa et al. |
| 2007/0263412 A1 | 11/2007 | Lee |

FOREIGN PATENT DOCUMENTS

| JP | 2000-075134 | 3/2000 |
| JP | 2005-301183 | 10/2005 |
| JP | 2007-304553 | 11/2007 |
| JP | 2009-9099 | 1/2009 |
| WO | WO-2005-083475 A1 | 9/2005 |

OTHER PUBLICATIONS

Notice of Reasons for Rejection issued by JPO on Nov. 12, 2013 in connection with corresponding Japanese Patent Application No. 2009-229024.

* cited by examiner

*Primary Examiner* — Nathanael R Briggs
(74) *Attorney, Agent, or Firm* — Jean C. Edwards, Esq.; Edwards Neils PLLC

(57) ABSTRACT

A surface light source unit includes, in the following order: a light source; a light collecting sheet having light collection portions on at least one side of the light collecting sheet; and a light transmissive substrate having a flat portion and recesses on at least one side of the light transmissive substrate.

6 Claims, 4 Drawing Sheets

LIGHT TRANSMISSIVE SUBSTRATE, METHOD OF MAKING TRANSMISSIVE SUBSTRATE, SURFACE LIGHT SOURCE UNIT, POLARIZING PLATE, AND LIQUID CRYSTAL DEVICE

CROSS-REFERENCE TO RELATED APPLICATIONS

This application claims the benefit of Japanese Patent Application JP 2009-229024, filed Sep. 30, 2009, the entire content of which is hereby incorporated by reference, the same as if set forth at length.

FIELD OF THE INVENTION

This invention relates to a light transmissive substrate, a method of making a light transmissive substrate, a surface light source unit, a polarizing plate, and a liquid crystal display.

BACKGROUND OF THE INVENTION

Liquid crystal displays (LCDs) have recently enjoyed wide use because of small thickness, light weight, and low power consumption. An LCD includes a liquid crystal cell and a polarizing plate. A polarizing plate is usually composed of a pair of protective films and a polarizing film and obtained by stretching a polyvinyl alcohol film dyed with iodine to make a polarizing film and laminating a protective film to both sides of the polarizing film. A transmissive LCD has a polarizing plate on both sides of a liquid crystal cell and may further have one or more optical compensation films.

As LCDs do not produce light themselves, they need a surface light source. Backlight type LCDs are widely employed, in which a light diffusing member and a light collecting member, such as a diffuser sheet and a prism sheet, are disposed between a liquid crystal cell and a light source to establish a uniform surface light source system. A cold cathode fluorescent lamp or a light emitting diode is used as a light source. Some LCDs employ an edge light system in which a light source is placed along the edge of a light guide film and combined with a diffuser sheet, a prism sheet, and the like to make a surface light source system. As described, a backlight system is generally composed of a linear or point light source the light from which is converted to uniform surface light by use of a diffuser sheet.

A schematic view of a conventional LCD equipped with a backlight system for obtaining a surface light source is illustrated in FIG. 7. The conventional LCD includes, in the order described, a light source 52 having linear light sources 56, a first light diffuser sheet 58, a light collecting sheet 54, a second light diffuser sheet 60, and a liquid crystal panel 72. The liquid crystal panel 72 includes a liquid crystal cell 70 and a pair of polarizing plates 66. Each polarizing plate 66 is composed of a polarizing film 62 and a pair of protective films 64.

Light emitted from the light source 52 is diffused through the first diffuser sheet 58 and enters the light collecting sheet 54, where it is collected toward the front side to provide increased front brightness. The second diffuser sheet 60 in front of the light collecting sheet 54 widens within a predetermined range the viewing angle once narrowed by the light collecting sheet 54.

By disposing the diffuser sheet on both sides of the light collecting sheet 54, unevenness of brightness is reduced, and in-plane uniformity of display qualities is achieved. This configuration is also effective in preventing incident light from interfering with pixels of the liquid crystal cell and in scattering side lobe generated in prisms, thereby to prevent occurrence of an interference fringe such as Moire.

In recent years, reduction in the number of linear light sources 56 used in the light source 52 has been attempted to reduce the number of members making up an LCD as well as power consumption. With a decrease in thickness of LCDs, the distance between the light source 52 and each diffuser sheet 58 or 60 has been reduced. Under these circumstances, it has now become difficult to achieve uniform light diffusion with conventional diffuser sheets. In order to shorten the distance as much as possible, it has been proposed to substitute the diffuser sheet by a light-diffusing protective film on the polarizing film of the backlight side polarizing plate making up the liquid crystal panel.

For example, JP 2000-75134A proposes a diffusing polarizing plate having a diffusing layer containing porous amorphous particles and spherical particles and having prescribed characteristics, which allows for omission of a diffuser sheet.

JP 2007-304553A discloses a light collecting sheet (prism sheet) having a transparent resin layer containing light diffusing particles dispersed therein, which prevents occurrence of moire while retaining high brightness.

SUMMARY OF THE INVENTION

The diffuser film according to JP 2000-75134A has a low total light transmittance and, when applied to image display devices, can be a cause of reduction in front white brightness. If the haze of the diffuser film is reduced, i.e., the total transmittance is raised in order to maintain the front brightness, such can result in deterioration of display uniformity (e.g., unevenness of backlight) or occurrence of an interference fringe such as Moire.

It has also been turned out that, when such a diffuser film having projections on its surface as disclosed in JP 2000-75134A is disposed adjacent to a prism sheet with no diffuser sheet therebetween a, the prism sheet is potentially scratched by rubbing against the diffuser film to cause spot unevenness of brightness. This problem has proved to emerge, particularly with mobile LCDs such as notebook computers which are subject to Vibration or mechanical shock and with LCDs having a slimmed backlight unit in which a diffuser film and a prism sheet are apt to contact with each other.

Although the prism sheet according to JP 2007-304553A is excellent in high brightness and prevention of moire, the layer containing light diffusing particles increases the total thickness of the prism sheet, which is disadvantageous for LCD thickness reduction.

An object of the invention is to provide a surface light source unit that provides high brightness, prevents moire, and contributes to thickness reduction and an LCD including the surface light source unit. Another object of the invention is to provide a light transmissive substrate useful in the surface light source unit.

To accomplish the above objects, the invention provides in its first aspect a surface light source unit including, in the following order, a light source, a light collecting sheet having light collection portions on at least one side thereof, and a light transmissive substrate having a flat portion and recesses on at least one side thereof.

The invention provides preferred embodiments of the surface light source unit, in which:

the side of the light collecting sheet having the light collection portions and the side of the light transmissive substrate having the flat portion and the recesses face to each other;

a slip agent is present on at least one of the side of the light collecting sheet having the light collection portions and the side of the light transmissive substrate having the flat portion and the recesses, the light collection portions of the light collecting sheet have the shape of stripes, semicircular columns, cones, or truncated cones, relationships (1) to (3) below are satisfied:

$$20 \leq Pa \leq 400 \quad (1)$$

$$0.5 \leq Lb \leq 100 \quad (2)$$

$$1.5 \leq (Pa/Lb) \leq 150, \quad (3)$$

wherein Pa is the distance (μm) between adjacent light collection portions; and Lb is an average length (μm) of openings of the recesses, the light transmissive substrate has a ratio of the total opening area of the recesses (Sd) to its total plane view area (Sa), i.e., Sd/Sa×100(%) of 1% to 90% and a haze of 15% to 95%, the light transmissive substrate has a layer containing a slip agent on its side with the flat portion and the recesses, and/or the layer containing a slip agent is a cured layer formed from a composition containing a slip agent having at least one of an ionizing radiation-curing functional group and a thermosetting functional group and at least one of an ionizing radiation-curing compound and a thermosetting compound.

The invention also provides in its second aspect an LCD including a pair of polarizing films, a liquid crystal cell between the pair of polarizing films, and the surface light source unit of the invention.

In a preferred embodiment of the LCD, the light transmissive substrate is used as a protective film for one of the polarizing films closer to the surface light source unit.

The invention also provides in its third aspect a light transmissive substrate having a flat portion and recesses on at least one side thereof. The area ratio of the total opening area of the recesses (Sd) to the total plane view area (Sa), i.e., Sd/Sa× 100(%) is 1% to 90%. The substrate has a haze of 15% to 95%. The substrate has a cured layer provided on its side with the flat portion and the recesses. The cured layer is formed from a composition containing a slip agent having at least one of an ionizing radiation-curing functional group and a thermosetting functional group and at least one of an ionizing radiation-curing compound and a thermosetting compound.

The invention also provides in its fourth aspect a method for producing a light transmissive substrate having a flat portion and recesses on at least one side thereof. The method includes the steps of making a light transmissive substrate having a flat portion and recesses on at least one side thereof and forming a layer containing at least a slip agent on the side of the substrate with the recesses. The step of making a substrate with recesses includes the substeps of casting a polymer solution containing at least a thermoplastic resin and a solvent on a support to form a web, stripping the web from the support, and drying the web. The polymer solution contains two or more solvents at least one of which has a dielectric constant of 35 or higher.

The invention provides preferred embodiments of the method, in which:

the polymer solution contains the solvent having a dielectric constant of 35 or higher in an amount of 0.3% to 30% by mass with respect to the total mass of the solvents, the polymer solution contains a solvent having a dielectric constant of 2 or more and less than 10 and a solvent having a dielectric constant of 10 or more and less than 35, the polymer solution comprises two or more polymer solutions having different compositions, at least one of which solutions contains a solvent having a dielectric constant of 35 or more, a solvent having a dielectric constant of 2 or more and less than 10, and a solvent having a dielectric constant of 10 or more and less than 35, and the substep of casting is carried out by casting the polymer solutions simultaneously or sequentially, the light transmissive substrate has substantially no internal voids, and/or the layer containing a slip agent is formed from a composition containing a slip agent having at least one of an ionizing radiation-curing functional group and a thermosetting functional group and at least one of an ionizing radiation-curing compound and a thermosetting compound.

The invention also provides in its fifth aspect a light transmissive substrate obtained by the method of the invention.

The invention also provides in its sixth aspect a polarizing plate including a polarizing film and a protective film, in which the protective film is the light transmissive substrate obtained by the method of the invention.

The invention also provides in its seventh aspect a surface light source unit having the light transmissive substrate obtained by the method of the invention.

The invention also provides in its eighth aspect an LCD having the polarizing plate of the invention or the surface light source unit of the invention.

According to the invention there is provided a surface light source unit that achieves high brightness, prevents moire, and contributes to thickness reduction.

BRIEF DESCRIPTION OF THE DRAWINGS

FIG. 6A and FIG. 6B illustrate a light transmissive substrate, of which FIG. 6A is a perspective, and FIG. 6B is a cross-section.

DESCRIPTION OF REFERENCE NUMERALS

Figure 1:
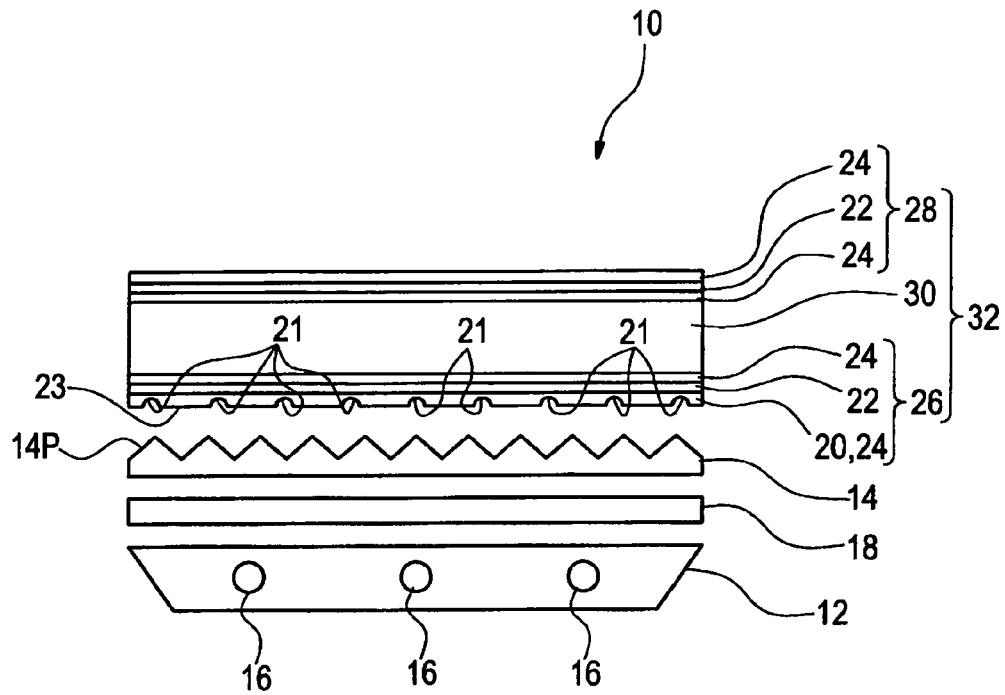
FIG. 1 schematically illustrates a configuration of an image display including a surface light source unit of the invention.

10: Image display device
12: Light source
18: Light diffuser sheet
14: Light collecting sheet
14P: Prism (light collection portion)
14L: Cylindrical lens (light collection portion)
20, 40: Light transmissive substrate
21: Recess
22: Polarizing film
23: Flat portion
24: Protective film
26: First polarizing plate 28: Second polarizing plate
30: Liquid crystal cell
32: Liquid crystal panel
42: Slip layer

DETAILED DESCRIPTION OF THE INVENTION

Preferred embodiments for carrying out the invention will be described with reference to the accompanying drawings, with no limitations thereto being intended.

FIG. 1 is a schematic illustration of an image display device (LCD) 10 having a surface light source unit according to an exemplary preferred embodiment of the invention.

The surface light source unit of the image display device 10 includes a light source (backlight) 12 having a plurality of linear light sources 16, a diffuser sheet 18, a light collecting sheet 14 having a plurality of light collection portions 14P, and a light transmissive substrate 20 in the order described in the direction toward a viewer.

The substrate 20 has a flat portion 23 and a plurality of recesses 21 on at least one side thereof (on the side closer to the light source 12 in FIG. 1). The light collecting sheet 14 and the substrate 20 are disposed such that the side of the former with the light collection portions 14P and the side of the latter with the recesses 21 face to each other.

The image display device 10 is composed of the surface light source unit and a liquid crystal panel 32. The liquid crystal panel 32 includes a first polarizing plate 26 (lower polarizing plate in FIG. 1) and a second polarizing plate 28 (upper polarizing plate in FIG. 1) and a liquid crystal cell 30 sandwiched between the two polarizing plates.

The first polarizing plate 26 and the second polarizing plate 28 each include a polarizing film 22 and a protective film on each side of the polarizing film 22. The light transmissive substrate 20 is used as either one of the protective films 24 of the first polarizing plate 26 (the light source side protective film 24 in the case of FIG. 1).

Figure 7:
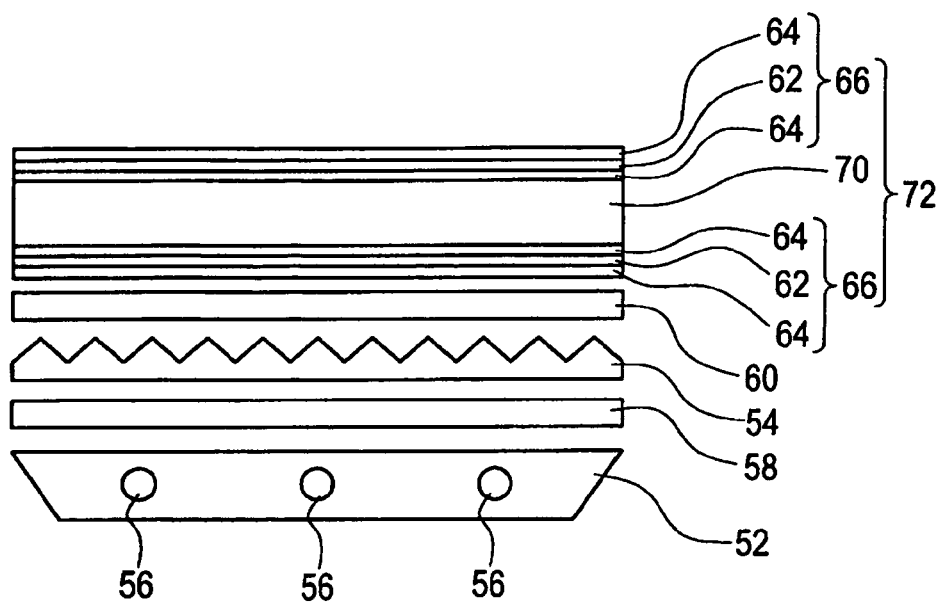
FIG. 7 schematically illustrates a configuration of an image display including a conventional backlight unit.

Since the protective film 24 of the first polarizing plate is the light transmissive substrate 20 having light diffusing properties, it exhibits equal or superior performance compared to the diffuser sheet 60 in FIG. 7. Using the light diffusive substrate 20 as the protective film 24 not only reduces moire and in-plane unevenness of brightness but also allows omission of the diffuser sheet 60 of FIG. 7. Omission of the diffuser sheet 60 leads to reduction of thickness of the surface light source unit. Furthermore, the problem of the prism sheet (light collecting sheet) being damaged, which can occur when the diffuser sheet 60 is omitted, is eliminated.

To achieve desired thickness reduction of the surface light source unit, the average distance between the apex of the individual light collection portions 14P of the light collecting sheet 14 and the surface of the flat portion 23 of the light transmissive substrate 20 is preferably 0 to 3 mm, more preferably 0 to 2 mm, even more preferably 0 to 1 mm.

Members constituting a backlight unit may be subject to temperature gradient immediately after turning on and/or humidity gradient depending on LCD storage conditions. Such a temperature and/or humidity gradient can cause the members to curl and come into partial contact with each other, resulting in any unevenness of display. Since the structure of the invention allows for reduction in the number of necessary members, the heat capacity of the backlight unit is reduced so that the temperature and/or humidity gradient in the backlight unit will decrease rapidly.

Even when the light collecting sheet 14 and the light transmissive substrate 20 are in contact with each other, there are still spaces therebetween, such as valleys between light collection portions 14 and the recesses 21 of the substrate 20, providing paths for water vapor and thereby eliminating an inside humidity gradient promptly. Thus, the structure of the invention rapidly reduces any unevenness due to temperature and/or humidity gradient.

Since the surface of the light transmissive substrate 20 is composed of a substantially flat portion 23 and recesses 21 made in the flat portion 23, even when the light collecting sheet 14 and the substrate 20 are in contact with each other, the contact is not point contact but linear contact so that the pressure is dispersed. The stress of contact will be further effectively dispersed by incorporating a slip agent on the surface of the light collecting sheet 14 and/or the substrate 20. As a result, unevenness due to minute variation of phase difference caused by a pressure distribution will be reduced.

The light collecting sheet 14 (hereinafter sometimes referred to as a member A) and the light transmissive substrate 20 (hereinafter sometimes referred to as a member B) will be described in detail.

The light collecting sheet 14 has light collection portions 14P on at least one side thereof. The light collection portions 14P may have the shape of stripes, semicircular columns, cones, truncated cones, and the like according to the desired angle distribution of light output from the surface light source unit. To enhance the light intensity in the normal direction of the sheet, the light collection portions 14P preferably have the shape of stripes (pleats) having a triangular cross-section, semicircular columns, circular cones, elliptic cones, or four-sided pyramids. The light collection portions 14P are preferably arrayed periodically on the surface of the light collecting sheet 14.

Figure 2:
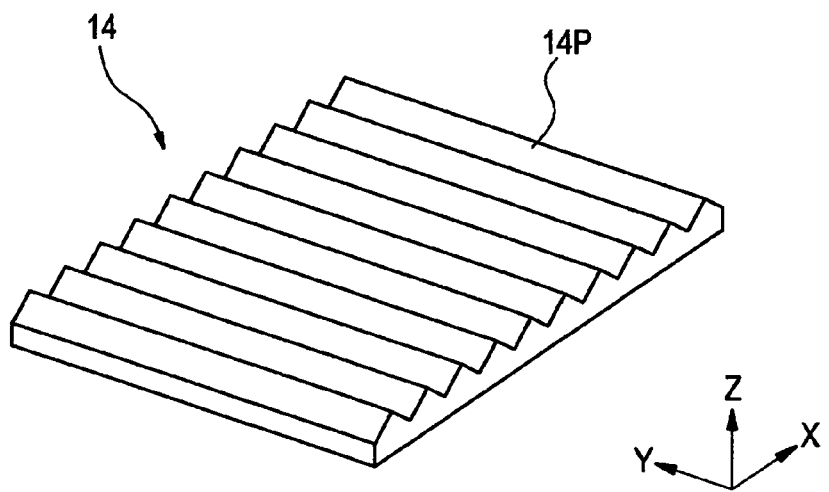
FIG. 2 is a schematic perspective of a light collecting sheet.
Figure 3:
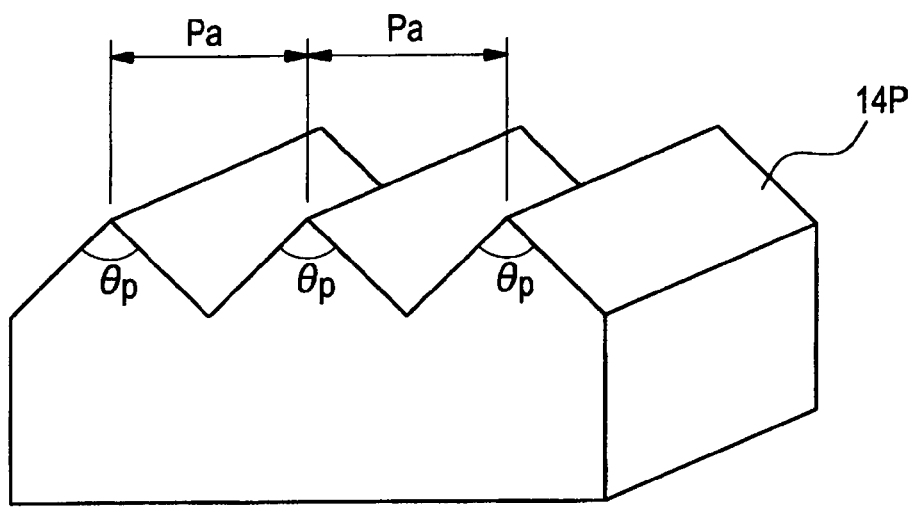
FIG. 3 is a partial enlarged view of the light collecting sheet of FIG. 2.

An example of the light collecting sheet 14 is shown in FIG. 2. The light collecting sheet 14 of FIG. 2 has a plurality of three-sided prisms 14P extending in a first direction (direction Y in FIG. 2) arrayed continuously in a second direction perpendicular to the first direction (direction X in FIG. 2) in a pattern of stripes. The prisms 14P of FIG. 2 are enlargedly illustrated in FIG. 3. The apex angle θp of the individual prisms 14P is preferably 70° to 110°, more preferably 75° to 105°. With the apex angle θp of 110° or smaller, good light collection performance and brightness improving effect are obtained. With the apex angle θp of 70° or greater, moderate directionality is secured so that a display is prevented from darkening when viewed other than from the front.

The pitch Pa (μm) of the light collection portions 14P is preferably 20 to 400 μm (20≤Pa≤400). A larger pitch is generally apt to lead to a higher front luminance. However, a large pitch can result in occurrence of moire due to the interference with the pixel pitch of the liquid crystal panel. A large pitch can also result in increased stress concentration when the projections of the light collecting sheet 14 and the facing light transmissive substrate 20 come into contact, which will damage the light collection portions 14P. With a small pitch Pa, on the other hand, although the possibility of occurrence of moire is reduced, the front brightness reduces.

With these factors taken into consideration, the pitch Pa of the light collection portions 14P is decided in accordance with the pixel pitch of the LCD.

Figure 4:
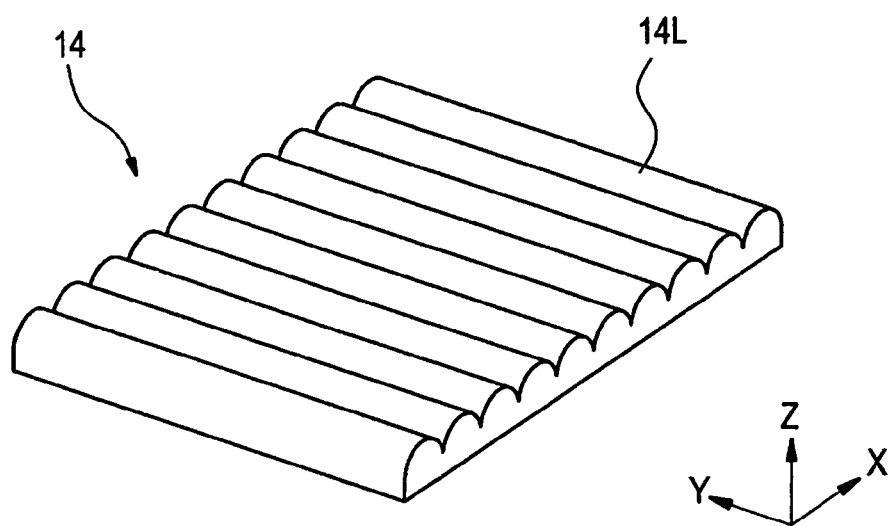
FIG. 4 is a schematic perspective of another light collecting sheet.

The individual light collection portions 14P may have any cross-sectional shape. As illustrated in FIG. 4, the light collection portions 14P may be an array of cylindrical lenses 14L with an aspheric surface, such as a hyperboloid, a paraboloid, or a higher order aspheric surface, (i.e., an array of semicircular columns). In this case, too, the pitch Pa of the light collection portions 14P preferably ranges from 20 to 400 μm.

The light collecting sheet 14 may be produced by, for example, melt extrusion, hot pressing, or a transfer process using a curing resin.

The damage of the light collecting sheet 14 may be minimized by the presence of a slip agent on the surface of the light collecting sheet 14, particularly on the side with the light collection portions 14P. A slip agent is made present on the surface of the light collecting sheet 14 preferably by forming the light collecting sheet 14 using a composition containing a curing compound and a slip agent. The kind, amount, and way of addition of the slip agent and the curing compound will be described later with reference to the light transmissive substrate (member B).

Figure 6A:
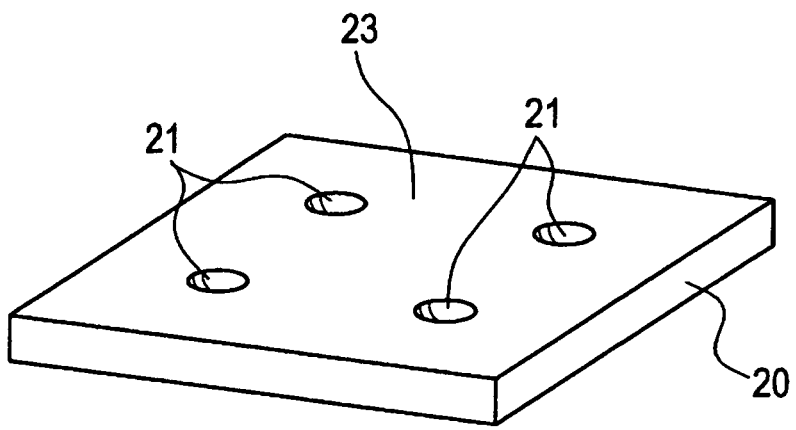
Figure 6B:
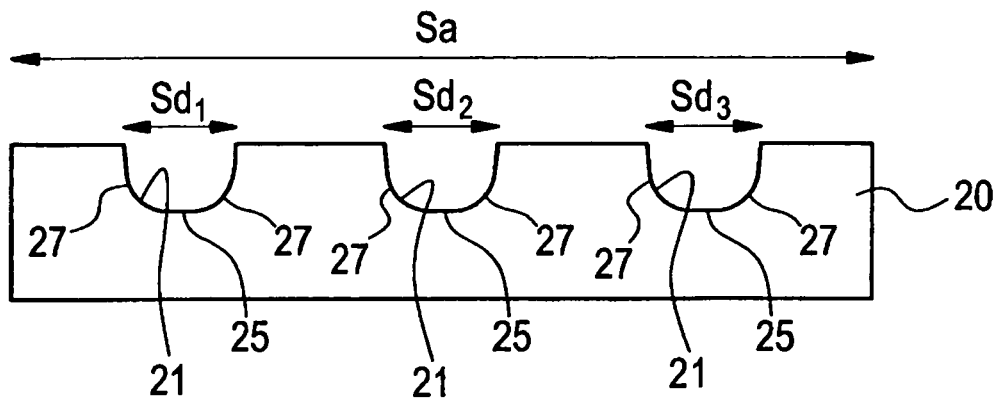

A preferred embodiment of the light transmissive substrate 20 is shown in FIGS. 6A and 6B. As illustrated, the substrate 20 has a flat portion 23 and recesses 21.

The individual recesses 21 preferably have an average length (Lb; μm) of 0.5 to 100 μm ($0.5 \leq Lb \leq 100$), more preferably 1 to 50 μm, even more preferably 1 to 30 μm. As used herein, the term "length" as for the recesses 21 refers to the longest dimension of the opening of a recess along the plane of the flat portion 23.

The individual recesses 21 preferably have a depth of 5 μm or less. From the viewpoint of diffusion performance, the e depth is more preferably 1 to 3 p.m. As used herein, the term "depth" as for the recesses 21 refers to an average value of depths of recesses 21 with an average length between 0.5 μm and 100 μm per unit area.

The average spacing between adjacent recesses 21 is preferably 1 to 100 μm, more preferably 1 to 50 μm, in view of diffusion performance. As used herein, the term "average spacing between adjacent recesses" refers to a value obtained by measuring the center-to-center distance between every recess and its closest recess and dividing the sum of the distances by the number of the recesses.

The center positions of the recesses may be periodic or non-periodic (at random). In applications to a surface light source unit, it is preferred that the recesses be located at random to eliminate the moire problem associated with the light collecting sheet.

In the invention, the average depth, the average length Lb, and the average distance of the recesses 21 are obtained by calculation from a surface profile determined with a profilometer of light interference type (non-contact type) or contact type. A profilometer of light interference type is exemplified by a 3D non-contact type profilometer Micromap MM5000 from Ryoka Systems Inc. A contact type profilometer is exemplified by Dektak 6M from Ulvac ES Inc. In carrying out the measurement using such a profilometer, a 1 mm$^2$ area of the film is scanned to automatically measure and calculate the distance from the surface level of the flat portion to the deepest part of every recess 21 and calculate an average depth of all the recesses 21. The average length Lb and average spacing of the recesses are calculated in the same manner.

The number of the recesses 21 on the surface of the light transmissive substrate 20 is preferably 25 to 1,000,000/mm$^2$. From the viewpoint of high light-diffusing performance and high total light transmittance, that number is more preferably 100 to 100,000/mm$^2$, even more preferably 500 to 7,000/mm$^2$, The standard deviation of the distribution in number of the recesses 21 about the mean number is preferably within ±20% in view of in-plane uniformity in light diffusing performance and total light transmittance. The standard deviation of the distribution in number of the recesses is more preferably within ±10%, even more preferably within ±5%, relative to the mean number. As used herein, the term "mean number" refers to a mean value of the numbers of recesses present in 100 randomly chosen 1 mm$^2$ areas. The uniform distribution of the recesses as described produces the light diffusion effects of the invention.

The standard deviation of the recess depth distribution about the mean depth is preferably ±20% in view of in-plane uniformity in light diffusing performance and total light transmittance. The standard deviation of the recess depth distribution is more preferably within ±10%, even more preferably within ±5%, relative to the mean depth. As used herein, the term "mean depth" refers to a mean value of the depths of 100 randomly chosen recesses 21. The distribution of average number of the recesses 21 per unit area is preferably narrow, i.e., the recesses 21 are preferably distributed uniformly.

When viewed vertically form above, the shape of the opening of the recesses 21 may be circular, polygonal, elliptic, or of any other shape bounded by a curved line but is preferably circular or nearly circular in terms of high total light transmittance. The circular opening of the recess 21 preferably has an equivalent circle diameter (or a projected area diameter) of 0.5 to 100 μm, more preferably 1 to 50 μm, even more preferably 1 to 30 μm, in terms of diffusing performance control. The individual recesses 21 may have a flat portion at the bottom thereof. Similarly to the shape of the opening, the shape of the flat portion at the bottom of the recesses 21, when viewed vertically from above, may be circular, polygonal, elliptic, or of any other shape bounded by a curved line but is preferably circular or nearly circular in terms of high total light transmittance. The circular flat portion at the bottom of the recess 21 preferably has an equivalent circle diameter (or a projected area diameter) of 0.12 to 85 μm, more preferably 0.35 to 40 μm, even more preferably 0.45 to 0.25 μm, in terms of high total light transmittance.

The breadth of the individual recesses 21 is defined to be the distance from side to side of the opening, measured along the perpendicular bisector of the length of the recess. The average aspect ratio of the opening of the recesses 21, i.e., the average length to average breadth ratio of the opening is preferably 0.8 to 1.2, more preferably 0.85 to 1.15, even more preferably 0.9 to 1.1, in terms of high total light transmittance.

A preferred cross-sectional shape of the recesses 21 will be described. The term "cross-sectional shape" as used herein refers to the shape of the recess in a cross-sectional view obtained by vertically cutting the light transmissive substrate 20 placed horizontally with its recessed side up.

The cross-sectional shape of the recesses 21 is not particularly limited but is preferably convex downward. More preferably, the cross-sectional shape of the individual recesses 21 consists of a bottom 25 that is generally parallel with the surface of the substrate 20 and a side wall interconnecting the bottom 25 and the periphery of the opening as illustrated in FIG. 6B. As a typical example of such a shape, a cup shape is preferred. The phrase "cup shape" as used herein is intended to mean a shape like a coffee or a tea cup that consists of a flat bottom 25 generally parallel to the surface of the substrate 20 the width (horizontal dimension) of which is at least 25% of the width (horizontal dimension) of the opening and a side wall 27 that curves gently upward from the periphery of the bottom 25 and is generally vertical near the opening edge. In the sense described, a crater-like shape or a cycloidal shape are included in the cup shape.

The recess may conceivably have a spherical or rectangular cross-sectional shape. However, while a spherical shape provides an increased haze because of its high curvature radius, no little light bends so that the forward light transmittance is slightly reduced, resulting in a reduced total light transmittance. On the other hand, since a rectangular recess has a flat bottom parallel to the surface of the substrate 20 at a high area ratio, a high total light transmittance is obtained, but there is only a small surface that bends light so that the haze is slightly low. From all these considerations, the cup shape provides both a surface that bends light (e.g., the curving side wall) and a flat surface parallel to the surface of the substrate 20 (e.g., the bottom), thereby achieving high haze and high total light transmittance.

The cross-sectional shape of the recesses can be confirmed by any method, e.g., SEM.

The opening of the individual recesses 21 preferably has a dimension (either the average length or the average breadth defined above) of 0.5 to 100 µm in any cross-sectional view of the light transmissive substrate 20 in view of diffusing performance control. The dimension is more preferably 1 to and even more preferably 1 to 30 µm.

It is preferred that the bottom 25 of the recesses 21 be generally parallel with the surface of the light transmissive substrate 20 in terms of high total light transmittance. The slope of the bottom 25 relative to the surface of the substrate 20 is preferably within ±10°, more preferably ±5°, even more preferably ±2.5°.

The bottom 25 of the individual recesses 21 preferably has a width of 0.12 to 85 µm in any cross-sectional view of the light transmissive substrate 20 in view of high total light transmittance. The width of the bottom 25 is more preferably 0.35 to 40 µm, and even more preferably 0.45 to 25 µm.

The bottom 25 of the recesses 21 preferably has a width corresponding to 25% to 85%, more preferably 35% to 80%, even more preferably 45% to 75%, of the width of the opening in any cross-sectional view of the substrate 20.

The ratio of the total opening area of the recesses 21 ($Sd=Sd_1+Sd_2+Sd_3+\ldots+Sd_n$) to the total plane view area (Sa) of the substrate 20, i.e., Sd/Sa×100(%) is preferably 1% to 90%, more preferably 2% to 70%, even more preferably 3% to 70%. With the weight put on the scratch resistance of the substrate 20, the area ratio defined above preferably ranges from 3% to 50%, in which range both the light diffusing performance and scratch resistance can be secured.

Consisting of the flat portion 23 and recesses 21, the light transmissive substrate 20 also exhibits anti-sticking properties. When wound into roll form or superposed on a prism sheet, the anti-sticking substrate 20 exhibits good handling properties and improved scratch resistance compared with a substrate with no recesses.

It is preferred that the pixel pitch Pc (µm) of a liquid crystal cell, the light collection portion pitch Pa (µm) of the light collecting sheet 14 (member A, e.g., a prism or cylindrical lens array), and the average length Lb (µm) of the recesses 21 of the light transmissive substrate (member B) satisfy the following relationships from the standpoint of improvement of white brightness, reduction of brightness unevenness, reduction of moire, and improvement of scratch resistance of the backlight unit.

Pa/Lb is preferably 1.5 to 150 (relationship (3): 1.5≤(Pa/Lb)≤150), more preferably 1.8 to 100, even more preferably 2.0 to 60. In order to reduce moire caused by the periodicity (Pa) of the surface profile of the light collecting sheet, it is particularly effective that the length (Lb) of the randomly distributed recesses 21 satisfies the above relationship. Pc/Pa is preferably 0.9 to 15, more preferably 1.0 to 12, even more preferably 1.5 to 10.

The above described surface profile of the light transmissive substrate 20 is obtained by the method of the invention described below. It is difficult to obtain by incorporating particles into the substrate. Although it is possible to mechanically make recesses on the surface of a substrate by, for example, rubbing the surface with sandpaper or sandblasting using sand or silica particles, the shapes of the resulting recesses are nearly random and do not satisfy the preferred conditions described supra. As a result, the substrate, while having a high haze, has a low total light transmittance. Besides, such mechanical methods involve an additional step for, for example, collecting the dust associated with the surface roughening, which increases the cost.

The light transmissive substrate of the invention exhibits light diffusing properties based on the above specified surface profile. Accordingly, using a polarizing plate having the light transmissive substrate as a protective film in an LCD allows for omission of a conventionally used diffuser sheet without generating an interference fringe, such as moire.

As used herein, the phrase "substantially flat" is intended to mean having no unevenness intended for light diffusion. It is acceptable that the substantially flat portion 23 has such unevenness that is caused by any extraneous substance or disturbance during the film formation. The substantially flat portion 23 of the substrate 20 has a centerline average roughness Ra of about 1 to 80 nm, preferably about 1 to 50 nm. The Ra is determined using an atomic force microscope, e.g., SPI-3800N from Seiko Instruments Inc. With such surface smoothness, the haze attributed to the light scattering on the surface is about 1% or less.

The haze of the light transmissive substrate 20 is 15% or more, more preferably 30% or more, even more preferably 50% or more, and still more preferably 60% or more. The higher the haze, the higher the light diffusing performance but the lower the total light transmittance. In application to image display devices, the low total light transmittance is one of the causes of reduction in front white brightness. From this viewpoint, the haze of the substrate 20 is preferably 15% to 95%, more preferably 30% to 90%, even more preferably 50% to 90%.

The haze is a total haze (the sum of an external haze due to light scattering on the surface and an internal haze due to internal light scattering) measured with a hazemeter NDH2001 manufactured by Nippon Denshoku Kogyo KK.

The total light transmittance of the light transmissive substrate 20 is preferably 70% or higher, more preferably 75% to 95%, even more preferably 80% to 93%. The parallel light transmittance of the substrate 20 is preferably 5% to 55%, more preferably 8% to 40%, even more preferably 10% to 40%. As used herein, the term "total light transmittance" refers to a transmittance for light including straight rays and diffused rays. The term "parallel light transmittance" refers to a transmittance for straight light rays.

The light transmissive substrate 20 of the invention can be produced by heat or pressure embossing, pattern transfer using a curing resin, film formation using a thermoplastic resin solution having a specific solvent system, or otherwise. When, in particular, the substrate is to be located near a high temperature light source as in a backlight unit of an LCD, it is preferably produced by a method capable of making a substrate having a small residual stress near the recesses and a small dimensional change (e.g., thermal expansion coefficient or humidity expansion coefficient) of the surface profile. In that respect, pattern transfer using a curing resin or film formation using a thermoplastic resin solution having a specific solvent system (hereinafter referred to as a solution process) is recommended. The solution process is particularly preferred.

The dimensional change of the light transmissive substrate 20 is determined as follows. The substrate is left to stand at a temperature 10° C. higher than the glass transition temperature of the polymer of the substrate for 24 hours. The average length of the recesses are measured before and after the standing to calculate the percent change. The dimensional change is preferably 5% or less in terms of stability of diffusing performance and total light transmittance with time. The dimensional change is more preferably 3% or less, even more preferably 1.5% or less. The light transmissive substrate of the invention has a reduced dimensional change probably because of almost uniform density of the composition of the substrate.

The light transmissive substrate 20 is preferably made of a polymer. The polymer to be used is not particularly limited but preferably selected from polymers having high transmittance for visible light. In the cases where the solution process is employed as will be described infra, the polymer is selected preferably from those providing a film forming solution, more preferably from thermoplastic resins.

Examples of useful polymers include, but are not limited to, cellulose acylates, polycarbonates, polyvinyl alcohol, polyimides, polyolefins, polyarylates, polyesters, polystyrene, styrene copolymers, polymethyl methacrylate, methyl methacrylate copolymers, and polyvinylidene chloride. For use as a protective film directly bonded to a polarizing film, it is preferred that the substrate 20 contain as a main polymer component a cellulose acylate and/or polyvinyl alcohol, which is compatible to, and therefore well adhesive to, polyvinyl alcohol usually used to make a polarizing film. A cellulose acylate is preferred for stability with time. The phrase "main polymer component" as used herein refers to a polymer present in the highest mass ratio of polymers making up the substrate. When the substrate contains only one polymer, that polymer is the main polymer component.

Examples of the cellulose materials providing cellulose acylates include cotton linter, kenaf, and wood pulp (hardwood pulp or softwood pulp). If desired, two or more of these materials may be used in combination.

A cellulose acylate is obtained by acylating a cellulose material with, e.g., a carboxylic acid to have some or all of the hydrogen atoms of the hydroxyl groups at the 2-, 3-, and 6-positions of glucose units thereof displaced with an acyl group. The acyl group preferably contains 2 to 22, more preferably 2 to 4, carbon atoms. Examples of the acyl group include acetyl, propionyl, butyryl, isobutyryl, pivaloyl, heptanoyl, hexanoyl, octanoyl, decanoyl, dodecanoyl, tridecanoyl, tetradecanoyl, hexadecanoyl, octadecanoyl, cyclohexanecarbonyl, oleoyl, benzoyl, naphthylcarbonyl, and cinnamoyl. Preferred of them are acetyl, propionyl, butyryl, dodecanoyl, octadecanoyl, pivaloyl, oleoyl, benzoyl, naphthylcarbonyl, and cinnamoyl. More preferred are acetyl, propionyl, and butyryl. The cellulose acylate may contain different acyl groups.

The haze of a cellulose acylate film can be adjusted by adjusting a degree of substitution of the hydroxyl groups with an acetyl group (with 2 carbon atoms) (hereinafter referred to as SA) and a degree of substitution of the hydroxyl groups with an acetyl group with 3 or more carbon atoms (hereinafter referred to as SB).

While the (SA+SB) value depends on the desired haze, it preferably satisfies the relation: $2.70<SA+SB\leq 3.00$, more preferably $2.80\leq SA+SB\leq 3.00$, even more preferably $2.85\leq A+S\leq 2.98$. A greater (SA+SB) value tends to help obtain a high haze.

The haze of a cellulose acylate film is also adjustable by SB adjustment. A higher SB tends to help obtain a high haze and tends to result in a lower elastic modulus and a lower melting temperature of the film. Taking the balance between haze and other physical properties, the range of SB is preferably $0\leq SB\leq 2.9$, more preferably $0.5\leq SB\leq 2.5$, even more preferably $1\leq SB\leq 2.0$. When all the hydroxyl groups are substituted with an acyl group, the degree of substitution is 3.

For the details of cellulose acylate synthesis, reference may be made to *Journal of Technical Disclosure*, No. 2001-1745, pp. 7-12, issued on Mar. 15, 2001 by Japan Institute of Invention and Innovation.

The light transmissive substrate 20 may contain additives in addition to one or more polymers. Examples of useful additives include plasticizers (0.01% to 20%), ultraviolet absorbers (0.001% to 1%), fluorine-containing surfactants (0.001% to 1%), release agents (0.0001% to 1%), antioxidants (0.0001% to 1%), optical anisotropy controlling agents (0.01% to 10%), and infrared absorbers (0.001% to 1%), the ranges in the parentheses indicating respective preferred ranges of the amount of addition, all given by mass.

The light transmissive substrate 20 may further contain organic and/or inorganic particles within a range that does not impair the effects of the invention. When added to improve stability of the running web of film, the particles preferably have a particle size of 5 to 3000 nm and are preferably added in an amount of 1% or less by mass. When added to auxiliary cause internal light scatter, the particles preferably have a particle size of 1 to 20 μm and are preferably added in an amount of 2% to 30% by mass. The particles added for that purpose preferably has a refractive index difference of 0 to 0.5 from the refractive index of the substrate containing no such particles. Examples of useful inorganic particles include particles of silicon oxide, aluminum oxide, and barium sulfate. Examples of useful organic particles include particles of acrylic resins, divinylbenzene resins, benzoguanamine resins, styrene resins, melamine resins, acrylic-styrene copolymer resins, polycarbonate resins, polyethylene resins, and polyvinyl chloride resins.

When particles are incorporated in the substrate to impart internal light scattering properties, the resultant internal haze is preferably not so high as to cause too strong backscatter and too great reduction in total light transmittance. Specifically, the internal haze due to the light scattering particles is preferably 1% to 60%, more preferably 3% to 50%.

A preferred method for making the light transmissive substrate 20 will then be described. The substrate 20 of the invention is conveniently produced by the method without requiring complicated operation nor special equipment.

The method includes the step of making a light transmissive substrate having a flat portion and recesses. The step includes the substeps of casting a polymer solution containing at least a thermoplastic resin and a solvent on a support to form a web, stripping the web from the support, and drying the web.

First of all, a polymer solution containing a thermoplastic resin and a solvent is provided. The thermoplastic resin concentration of the solution is preferably 5% to 40%, more preferably 10% to 25%, even more preferably 10% to 15%, by mass to secure film forming properties and minimize streaks that may occur during long-term continuous casting operation. The viscosity of the polymer solution is preferably 1000 to 50000 cP, more preferably 5000 to 20000 cP.

The polymer solution preferably contains two or more mutually incompatible solvents at least one of which has a dielectric constant of 35 or higher. Using such a solvent system allows for properly controlling the surface profile of the resulting light transmissive substrate 20. Usually, a dope containing mutually compatible solvents is used to make cast film, which is often recess-free. Film having recesses on its surface could be formed by use of specifically combined, mutually compatible solvents, but it would have internal voids. Because the refractive index of air in voids (=1.0) is largely different from that of the film forming material, large-angle scattering increases at the voids, which can cause back-scattering. Such a film having internal voids increases back-scatter with an increase in haze, resulting in a reduction of total transmittance, and therefore fails to obtain both a high haze and a high total light transmittance.

As used herein, the phrase "mutually incompatible solvents" is intended to mean that 100 g of either one of solvents A and B is capable of dissolving only 4 g or less of the other in a system solely composed of solvents A and B at 20° C.

A polymer film having small recesses on its surface is obtained from a polymer solution prepared by dissolving a polymer in a solvent system composed of two or more solvents at least one of which has a dielectric constant of 35 or more. It is preferred for the resulting film to have substantially no voids in the inside thereof. Specifically, the internal porosity of the substrate of the invention is preferably 10% or less, more preferably 5% or less, even more preferably 3% or less, by volume.

It is preferred for the solvent system to contain a solvent having a dielectric constant of 35 or more (hereinafter referred to as a high dielectric solvent) in a proportion of at least 0.3% by mass, more preferably 1.0% by mass or more, even more preferably 1.5% by mass or more, to control the film surface profile more properly. On the other hand, a solvent system having too high a proportion of the high dielectric solvent hardly dissolves a polymer. Even if such a solvent system successfully provides a polymer solution, the solution would have a high haze and undergo deterioration with time or provide a film with increased extraneous matter. From this perspective, the proportion of the high dielectric solvent is preferably not more than 30% by mass, more preferably 10% by mass or less.

When a film is formed from a polymer solution prepared by using a solvent system containing a prescribed proportion of the high dielectric solvent, it is considered that phase separation occurs between the polymer and the high dielectric solvent in the solution during film formation or while the solvents evaporate after the film formation. The phase separation seems to help form small recesses on the film surface as possessed by the substrate of the invention. To help form small recesses more effectively, it is preferred that the boiling point of the high dielectric solvent be higher than that of the low boiling solvent hereinafter described, more preferably higher by at least 5° C., even more preferably higher by 10° C. or more. It is also preferred that the high dielectric solvent and the low boiling solvent not form an azeotrope.

A dielectric constant, represented by c, of a solvent is a factor establishing the relation between electric flux density D and electric field E: D=6E. A dielectric constant of a solvent is a parameter correlated to polarizability of the solvent molecule. Dielectric constants of solvents are given, e.g., in *Kagaku Binran Kisohen I,* 5th Ed., 1-770, "relative permittivity".

The following are examples of high dielectric solvents. The numbers in the parentheses following the solvent name indicate dielectric constant (hereinafter the same). Water (78), glycerol (43), ethylene glycol (37), dimethylformamide (37), acetonitrile (38), dimethyl sulfoxide (49), formic acid (58), and formamide (110). Preferred of them is water in terms of ease of handling in film formation, such as ease of drying and safety.

The high dielectric solvent preferably has a boiling point of 70° to 300° C., more preferably 80° (to 250° C., even more preferably 90° to 210° C., in terms of ease of surface profile control.

It is preferred for the solvent system contain, in addition to the high dielectric solvent, at least one organic solvent which is a good solvent for the polymer as a main solvent. While any good solvent for the polymer may be used as a main solvent, the main solvent is preferably incompatible with the high dielectric solvent. When the solvent system is composed solely of the dielectric solvent and the main solvent, the main solvent must be incompatible with the dielectric solvent.

The main solvent is preferably a low boiling solvent having a boiling point of 80° C. or lower to reduce the drying load. The boiling point of the main solvent is more preferably 10° to 80° C., even more preferably 20° to 60° C. In some cases, an organic solvent with a boiling point of 30° to 45° C. is used preferably as a main solvent.

Halogenated hydrocarbons are particularly preferred as a main solvent. In some cases, esters, ketones, ethers, alcohols, and hydrocarbons are also preferred as a main solvent. The solvents described may have a branched structure or a cyclic structure. The main solvent may contain two or more of functions groups of esters, ketones, ethers, and alcohols, i.e., —O—, —CO—, —COO—, and —OH—. The hydrogen atom of the hydrocarbon moiety of the esters, ketones, ethers, and alcohols may be displaced with a halogen atom, particularly a fluorine atom. As used herein, the phrase "main solvent" refers to a solvent constituting the solvent system in the highest mass ratio. When polymer the solution contains only one solvent, that solvent is the main solvent.

The organic solvents that can be used in combination with the main solvent include not only the above mentioned high dielectric solvent but halogenated hydrocarbons, esters, ketones, ethers, alcohols, and hydrocarbons, each of which may have a branched structure or a cyclic structure. These organic solvents may contain two or more of functions groups of esters, ketones, ethers, and alcohols, i.e., —O—, —CO—, —COO—, and —OH—. The hydrogen atom of the hydrocarbon moiety of esters, ketones, ethers, and alcohols may be displaced with a halogen atom, particularly a fluorine atom.

When the main solvent and the high dielectric solvent are mutually compatible, the dielectric solvent and the organic solvent used in combination with the main solvent should be incompatible with each other.

The halogenated hydrocarbons are preferably chlorinated hydrocarbons, including dichloromethane and chloroform, with dichloromethane being more preferred. Examples of the esters include methyl formate, ethyl formate, propyl formate, pentyl formate, methyl acetate, ethyl acetate, and pentyl acetate. Examples of the ketones include acetone, methyl ethyl ketone diethyl ketone, diisobutyl ketone, cyclopentanone, cyclohexanone, and methylcyclohexanone. Examples of the ethers include diethyl ether, methyl tert-butyl ether, diisopropyl ether, dimethoxymethane, dimethoxyethane, 1,4-dioxane, 1,3-dioxolane, 4-methyldioxolane, tetrahydrofuran, methyltetrahydrofuran, anisole, and phenetole. Examples of the alcohols include methanol, ethanol, 1-propanol, 2-propanol, 1-butanol, 2-butanol, tert-butanol, 1-pentanol, 2-methyl-2-butanol, cyclohexanol, 2-fluoroethanol, 2,2,2-trifluoroethanol, and 2,2,3,3-tetrafluoro-1-propanol. Examples of the hydrocarbons are n-pentane, cyclohexane, n-hexane, benzene, and toluene.

When the main polymer component of the light transmissive substrate 20 is a cellulose acylate, it is preferable to use a solvent system containing the high dielectric solvent, a solvent having a dielectric constant of 10 or greater and smaller than 35 (hereinafter sometimes referred to as a medium dielectric solvent) and a solvent having a dielectric constant of 2 or greater and smaller than 10 (hereinafter sometimes referred to as a low dielectric solvent). The described solvent system provides a highly transparent polymer solution in a stable manner. Using the high dielectric solvent is advantageous for surface profile control, whereas using a low dielectric solvent is advantageous for improving polymer solubility. Because the high and the low dielectric solvents have poor compatibility, a polymer solution (dope) using them is inferior in stability. Then using a medium dielectric solvent improves the compatibility between the high and the low dielectric solvents thereby providing a wide latitude of solvent composition for achieving film surface profile control and dope stability and improving process suitability.

The amount of the medium dielectric solvent in the mixed solvent system is preferably 0.3% to 30%, more preferably 1% to 15%, even more preferably 2% to 10%, by mass. The amount of the low dielectric solvent in the mixed solvent system is preferably 40% to 99.5%, more preferably 60% to 99%, even more preferably 70% to 98%, by mass.

The medium dielectric solvents include alcohols, ketones, and ethers. Specific examples are acetone (21), methyl ethyl ketone (19), diethyl ketone (14), diisobutyl ketone (15), cyclopentanone (19), cyclohexanone (18), methylcyclohexanone (18), ethyl 2-ethoxyacetate (11), 2-methoxyethanol (30), 1,2-diacetoxyacetone (16), acetylacetone (17), ethyl acetoacetate (16), methanol (33), ethanol (24), 1-propanol (22), 2-propanol (22), 1-butanol (17), 2-butanol (16), tert-butanol (11), 1-pentanol (14), 2-methyl-2-butanol (13), and cyclohexanol (15).

The low dielectric solvents include halogenated hydrocarbons and esters. Specific examples are dichloromethane (9), dimethoxyethane (6), 1,4-dioxane (2), 1,3-dioxolane (3), 1,3,5-trioxane (3), tetrahydrofuran (8), anisole (4), phenetole (4), ethyl formate (9), n-propyl formate (6), n-pentyl formate (6), methyl acetate (7), ethyl acetate (6), n-pentyl acetate (5), and 2-butoxyethanol (9).

A mixed solvent system containing water, at least one of the alcohols, and at least one of the halogenated hydrocarbons is preferred. A mixed solvent containing 0.3% to 30% by mass of water, 1% to 30% by mass of at least one of the alcohols, and 60% to 99% by mass of at least one of the halogenated hydrocarbons is more preferred. A mixed solvent containing water (78), methanol (33), and dichloromethane (9) is even more preferred.

The higher the water content, the more preferred for obtaining an increased haze of the film, but with the polymer solubility and film forming properties of the polymer solution (e.g., viscoelastic characteristics of the polymer solution) taken into consideration, the water content is preferably 0.5% to 10%, more preferably 1% to 5%, by mass. The smaller the alcohol content, the more advantageous for obtaining an increased haze of the film. Nevertheless, taking into consideration the polymer solubility and film forming properties of the polymer solution (e.g., reduction of streaks that may occur during long-term continuous coating operation), the alcohol content is preferably 3% to 20%, more preferably 5% to 10%, by mass. The total content of the solvents described other than the main solvent is preferably 0.8% to 40%, more preferably 2% to 35%, by mass.

The polymer solution is prepared using a method and equipment for dope preparation in ordinary solvent casting. For instance, the polymer solution may be prepared by once swelling and dissolving the polymer and necessary additives in the solvent system at low temperature (swelling step) and then completely dissolving the polymer and others while applying heat and pressure (dissolving step). In the swelling step, the solvent system is maintained at a low temperature of about −10° to 39° C. During the swelling step, the solvent system is preferably stirred to help dissolve part or the whole of the polymer and others. The swelling step is preferably carried out for about 0.1 to 6 hours. In the dissolving step, the system is preferably heated to about 40° to 240° C. and pressurized to about 0.2 to 30 MPa. The heating temperature and pressure described are not limitative and decided according to the solute and solvent. The dissolving step is preferably carried out for about 0.1 to 6 hours.

The resulting polymer solution is then formed into film. Film formation is achieved by a general solvent casting method, in which the polymer solution (dope) is cast on a support, e.g., a drum or a belt, and the solvent is made to evaporate to form a film. The surface of the support is preferably mirror finished.

Solvent casting may be carried out using a single dope, or two or more dopes may be co-cast on the same support to obtain a multilayered cast film. In the latter case, co-casting may be carried out by any method generally used in the manufacture of multilayered sheets or films. For example, a feed block die with which the number of layers to be co-extruded is easily increased and a multimanifold die with which multiple layers are co-extruded with good thickness accuracy may be used. A feed block system is preferred.

In the case of simultaneous or sequential co-casting, particularly in the preparation of a three or more layered cast film, the dope having the specific solvent system as described above is preferably used to form an outermost layer or a second-outermost layer to obtain a film with an increased haze. When the dope having the specific solvent system is used as a second-outermost layer, it is preferred that the thickness of the outermost layer not exceed either 10 μm or 10% of the total film thickness. The thickness of the outermost layer more preferably does not exceed either 5 μm or 5%, even more preferably either 3 μm or 3%. When the thickness is within the preferred range, contamination of the casting head is sometimes reduced. It is preferred that the dope having the specific solvent system be used to form a layer that is not in direct contact with the support (e.g., drum or belt) in terms of releasability from the support.

When two or more polymer solutions different in composition are cast simultaneously or successively, it is preferred that at least one of the polymer solutions contain a solvent having a dielectric constant of 35 or greater, a solvent having a dielectric constant of 2 or greater and smaller than 10, and a solvent having a dielectric constant of 10 or greater and smaller than 35.

With respect to casting and drying techniques that can be used to carry out the solvent casting, reference can be made, e.g., to JP 58-127737A, JP 61-106628A, JP 2-276830A, JP 4-259511A, JP 5-163301A, JP 9-95544A, JP 10-45950A, JP 10-95854A, JP 11-71463A, JP 11-302388A, JP 11-322946A, JP 11-322947A, JP 11-323017A, JP 2000-53784A, JP 2000-273184A, JP 2000-273239A, U.S. Pat. Nos. 2,336,310, 2,367,603, 2,492,078, 2,492,977, 2,492,978, 2,607,704, 2,739,069, and 2739070, British Patents 640731 and 736892, JP 45-4554B, JP 49-56143, JP 60-176834A, JP 60-203430A, and JP 62-115035A.

The surface temperature of the support, e.g., a drum or a belt, on which the dope is cast is preferably 10° C. or lower.

The web stripped from the support is preferably dried to evaporate the residual solvent. Drying is carried out by applying dry air. The temperature of the dry air may be raised stepwise to carry out multi-stage drying. The details of casting and drying techniques are described in JP 2005-104148A, pp. 120-146, the disclosure of which may be applied to the invention.

When three or more layers are formed by co-casting, the outermost layer or the second-outermost layer may be formed of a dope that does not contain the high dielectric solvent as above defined but contains a solvent having a medium dielectric constant of about 10 to 35 and a solvent having a low dielectric constant of about 4 to 10. The proportion of the solvent with a medium dielectric constant in the total solvent preferably ranges from 20% to 90%, more preferably from 20% to 50%, by mass. Although the dope described provides a film with internal voids if cast singly, when it is cast to form the outermost or the second-outermost layer of a multilayer cast film having at least three layers to exist at a depth of about 30 μm from the surface, the voids that have been closed at the middle of the film thickness are opened in the vicinity of the film surface. Eventually, a film having recesses on its surface is obtained.

The resulting polymer film may be used as a light transmissive substrate 20 either as such or, if desired, after subjected to stretch treatment to adjust the haze. The stretching may be carried out under any conditions generally employed, for example, at a stretching temperature of from about (Tg−20° C.) to (Tg+50° C.) and a stretch ratio of about 20% to 40%. The stretching may be conducted using stretching rollers. The stretching may be either uniaxial (longitudinal or transverse direction) or biaxial (longitudinal and transverse directions). In general, the film of continuous web form is longitudinally uniaxially stretched.

If desired, a layer containing a slip agent (hereinafter referred to as a slip layer) may be provided on the recessed side of the light transmissive substrate 20 as will be described infra.

While not limited thereto, the thickness of the light transmissive substrate 20 usually ranges from 20 to 200 μm. From the preference for a smaller thickness, the thickness is preferably about 20 to 100 μm, more preferably 20 to 80 μm.

In order to improve the slip between the members A and B thereby to prevent stress concentration and scratch damage to the members, it is preferred that at least one of the members A and B contain a slip agent in its surface region. Examples of useful slip agents include, but are not limited to, compounds having a polysiloxane partial structure and compounds containing a fluorine atom.

The compound having a polysiloxane structure may be a compound containing a structure represented by formula (I):

Formula (I)

wherein $R^1$ and $R^2$, which may be the same or different, each represent alkyl or aryl; and p represents an integer of 10 to 500.

The alkyl preferably contains 1 to 10 carbon atoms, more preferably 1 to 5 carbon atoms. The aryl preferably contains 6 to 20 carbon atoms, more preferably 6 to 10 carbon atoms. The alkyl and aryl are each optionally substituted with any substituent, preferably a halogen atom, more preferably a fluorine atom.

The compound having a polysiloxane structure preferably contains at least one of an ionizing radiation curing functional group and a thermosetting functional group.

Examples of the silicone compounds having an ionizing radiation curing functional group in the molecule thereof include, but are not limited to, X-22-174DX, X-22-2426, X-22-164B, X22-164C, and X-22-1821 (all from Shin-Etsu Chemical CO., Ltd.; FM-0725, FM-7725, FM6621, FM-1121, Silaplane FM0275, and Silaplane FM0721 (all from Chisso Corp.); and DMS-U22, RMS-033, RMS-083, UMS-182, DMS-H21, DMS-H31, HMS-301, DMS121, DMS123, DMS131, FMS141, and FMS221 (all from Gelest, Inc.).

Examples of the silicone compounds having a thermosetting functional group in the molecule thereof include compounds containing a hydroxyl group. Examples of the compounds containing a hydroxyl group include, but are not limited to, X-22-160AS, KF-6001, KF-6002, KF-6003, X-22-170DX, X-22-176DX, X-22-176D, and X-22-176F (all from Shin-Etsu Chemical); FM-4411, FM-4421, FM-4425, FM-0411, FM-0421, FM-0425, FM-DA11, FM-DA21, and FM-DA25 (all from Chisso); and CMS-626 and CMS-222 (both from Gelest). Examples of the compounds having a functional group reactive with a hydroxyl group include X-22-162C and KF-105 (both from Shin-Etsu Chemical) and FM-5511, FM-5521, FM-5525, FM-6611, FM-6621, and FM-6625 (all from Chisso).

The silicone compounds described in JP 2003-112383A, Tables 2 and 3 are also preferably used.

When it is desired to fix the silicone compound more securely, a copolymer having a polysiloxane structure in the main or side chain thereof and a crosslinking reactive group may be used. Examples of such a copolymer include those described in JP 2007-291372A, Tables 1 and 2 and JP 2008-106190A.

A combination of a high molecular radical-generator having a polysiloxane structure and a radical reactive curing compound may also be used to form a cured layer having the polysiloxane structure fixed. Examples of such a compound are described in JP 2008-106190A, paras. 0036 to 0049.

It is also preferred to use a slip agent containing a fluorine atom. Such an F-containing compound is preferably a compound containing a fluoroalkyl group. The fluoroalkyl group preferably has 1 to 20 carbon atoms, more preferably 1 to 10 carbon atoms. The fluoroalkyl group may be straight chain (e.g., —$CF_2CF_3$, —$CH_2(CF_2)_4H$, —$CH_2(CF_2)_8CF_3$, or —$CH_2CH_2(CF_2)_4H$), branched (e.g., $CH(CF_3)_2$, $CH_2CF(CF_3)_2$, $CH(CH_3)CF_2CF_3$, or $CH(CH_3)(CF_2)_5CF_2H$) or alicyclic (preferably 5- or 6-membered, e.g., perfluorocyclohexyl or perfluorocyclopentyl, or alkyl substituted with such an alicyclic fluoroalkyl) and may contain an ether bond (e.g., $CH_2OCH_2CF_2CF_3$, $CH_2CH_2OCH_2C_4F_8H$, $CH_2CH_2OCH_2CH_2C_8F_{17}$, or $CH_2CH_2OCF_2CF_2OCF_2CF_2H$). The F-containing compound may have two or more fluoroalkyl groups per molecule.

The F-containing compound preferably has a curing functional group. Examples of the curing functional group include, but are not limited to, hydroxyl, silanol, glycidyl, oxetanyl, epoxy, carboxyl, amino, vinyl, methacryloyloxy, and acryloyloxy. Preferred of them are hydroxyl, silanol, epoxy, methacryloyloxy, and acryloyloxy. Methacryloyloxy and acryloyloxy are particularly preferred.

The F-containing compound preferably further has at least one, more preferably more than one, substituent contributory to bond formation with, or compatibility with, a material forming the member A or B. The two or more such substituents may be the same or different. Examples of such substituents are acryloyl, methacryloyl, vinyl, allyl, cinnamoyl, epoxy, oxetanyl, hydroxyl, polyoxyalkylene, carboxyl, and amino.

The F-containing compound may be in the form of polymer or oligomer. The polymer or oligomer may contain a repeating unit having no fluorine atom. The molecular weight of the polymer or oligomer is not particularly limited.

The F content in the F-containing compound is preferably, though not limited to, at least 20%, more preferably 30% to 70%, even more preferably 40% to 70%, by mass.

Examples of preferred F-containing compounds are R-2020, M-2020, R-3833, and M-3833 (all from Daikin Industries, Ltd.), and Megaface series (F-171, F-172, and F-179F) and Defensa MCF-300 (all from DIC Corp). More specific description and examples of the F-containing compounds are given in JP 2007-108726A, paras. 0136-0141, JP 2007-114772A, paras. 0129-0152, and JP 2007-272197A, paras. 0039-0058.

The above described slip agents may be used either individually or as a combination thereof.

The slip agent can be incorporated into the surface region of at least one of the members A and B by, for example, applying or transferring the slip agent to the member or adding the slip agent to the material forming the member. The slip agent may be applied in the form of a coating composition by spin coating, dipping, roll coating, gravure coating, curtain flow coating, die coating, or spraying. Transfer of the slip agent is achieved by, for example, preparing a transfer sheet containing the slip agent, bringing the transfer sheet into contact with the member under pressure while, if necessary, heating thereby to transfer the slip agent to the member.

The slip agent can be incorporated to either one of the members A and B, preferably both of them. In the latter case, the slip agents of the members A and B preferably have the same structure. It is also a preferred embodiment that the slip agent incorporated into the surface region of either one of the members A and B, preferably the member B, be transferred to the other member, whereby the slip agent is present on both the members A and B.

The slip agent content in the surface region of the member A and/or the member B is determined by ESCA (or XSP). It is generally said that the depth detectable by ESCA is about 5 nm. The slip agent content in the surface region as measured by ESCA is preferably at least 5%, more preferably 10% or more, even more preferably 15% to 100%. In the case of the compound having a polysiloxane structure, the silicon to carbon atom ratio (Si/C) as determined by ESCA is preferably 0.05 to 0.50, more preferably 0.10 to 0.50, even more preferably 0.20 to 0.50. In the case of the F-containing compound, the fluorine to carbon atom ratio (F/C) as determined by ESCA is preferably 0.20 to 3.0, more preferably 0.50 to 2.7, even more preferably 1.0 to 2.5.

In the invention, the surface composition analysis by ESCA is implemented using ESCA-3400 from Shimadz Corp., which enables outermost surface analysis, under conditions of degree of vacuum of $1 \times 10^{-5}$ Pa, an X-ray source (target) of Mg, a voltage of 12 kV, and a current of 20 mA.

First and second preferred embodiments in which a slip agent is incorporated to the surface region of the member A or B will be described hereunder.

Figure 8:
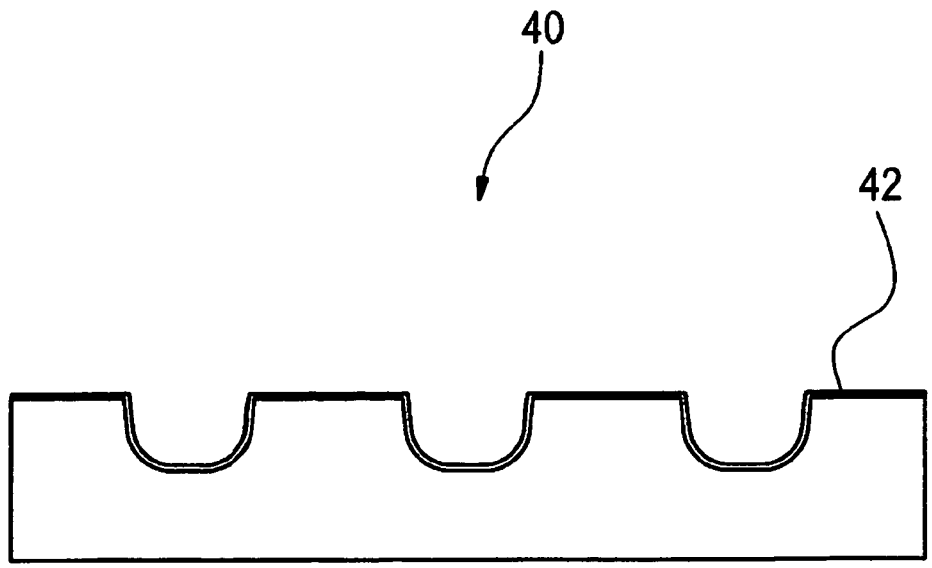
FIG. 8 schematically illustrates a light transmissive substrate with a slip agent-containing layer formed thereon.

In a first preferred embodiment, a layer containing a slip agent (slip layer) is provided on the surface of the member B, preferably on the recessed side of the member B. A schematic cross-section of the light transmissive substrate according to the first embodiment is shown in FIG. 8, in which a light transmissive substrate 40 has a slip layer 42 on its surface with recesses.

The slip layer essentially contains a slip agent and optionally contains a curing resin, a solvent, a curing initiator, a leveling agent, a viscosity modifier, an antistatic agent, and other necessary additives. In a more preferred embodiment, the slip layer is a cured layer obtained by applying a composition containing a slip agent having at least one of an ionizing radiation-curing functional group and a thermosetting functional group and at least one of an ionizing radiation-curing compound and a thermosetting compound and, if necessary, other additives to the surface of the member B, followed by curing the composition. The cured layer, i.e., the slip layer may be a uniform layer having a constant thickness or a nonuniform layer having a slip agent content distribution.

The curing resin is preferably formed by crosslinking or polymerization reaction of at least one of an ionizing radiation curing compound and a thermosetting compound.

A curing resin layer forming the slip layer can be formed by the crosslinking or polymerization reaction of the ionizing radiation curing compound and the thermosetting compound.

Examples of the curing functional group include, but are not limited to, hydroxyl, silanol, glycidyl, oxetanyl, epoxy, carboxyl, amino, vinyl, methacryloyloxy, and acryloyloxy. Preferred of them are hydroxyl, silanol, epoxy, methacryloyloxy, and acryloyloxy. Methacryloyloxy and acryloyloxy are particularly preferred.

Examples of photopolymerizable polyfunctional monomers having a photopolymerization functional group include (meth)acrylic diesters of alkylene glycols, such as neopentyl glycol acrylate, 1,6-hexanediol (meth)acrylate, and propylene glycol di(meth)acrylate; (meth)acrylic diesters of polyoxyalkylene glycols, such as triethylene glycol di(meth)acrylate, dipropylene glycol di(meth)acrylate, polyethylene glycol di(meth)acrylate, and polypropylene glycol di(meth)acrylate; (meth)acrylic diesters of polyhydric alcohols, such as pentaerythritol di(meth)acrylate; and (meth)acrylic diesters of ethylene oxide- or propylene oxide-adducts, such as 2,2-bis{4-(acryloxydiethoxy)phenyl}propane and 2,2-bis{4-(acryloxypolypropoxy)phenyl}propane. In the context of the present invention, the term "(meth)acrylate" represents acrylate and/or methacrylate. The same applies to (meth) acrylic acid and (meth)acryloyl.

Also preferred as a photopolymerization polyfunctional monomer are epoxy (meth)acrylates, urethane (meth)acrylates, and polyester (meth)acrylates.

Preferred of them are esters between polyhydric alcohols and (meth)acrylic acid. More preferred are polyfunctional monomers having more than two (meth) acryloyl groups per molecule. Examples thereof are trimethylolpropane tri(meth) acrylate, trimethylolethane tri(meth)acrylate, 1,2,4-cyclohexane tetra(meth)acrylate, pentaglycerol triacrylate, pentaerythritol tetra(meth)acrylate, pentaerythritol tri(meth) acrylate, (di)pentaerythritol triacrylate, (di)pentaerythritol pentaacrylate, (di)pentaerythritol tetra(meth)acrylate, (di) pentaerythritol)pentaerythritol hexa(meth)acrylate, tripentaerythritol triacrylate, and tripentaerythritol hexatriacrylate.

Examples of the compound that can be used as a photocuring monomer of the slip layer are given in JP 2007-298974A, paras. 0158-0165.

Examples of cationically polymerizable groups include epoxy, oxetanyl, oxazolyl, and vinyloxy. Preferred are ring-opening polymerizable group. More preferred are epoxy and oxetanyl. Epoxy is particularly preferred. These polymerizable groups may have a substituent at any possible position.

The number of the cationically polymerizable groups per molecule of the curing agent is preferably two or more, more preferably 2 to 20, even more preferably 3 to 10.

Examples of the compounds that are preferably used in the invention are Denacol EX series (e.g., 314, 411, 421, 521, 611, and 612) from Nagase Chemtex Corp. and Celloxide series (e.g., GT301 and 401) from Daicel Chemical Industries, Ltd. The compounds described in JP 2007-298974A, paras. 0169-0176 are also usable.

These polyfunctional monomers may be used either individually or as a mixture of two or more thereof.

The curing compound that can be used in the invention may be a crosslinkable polymer having a crosslinking reactive group.

The main chain of the crosslinkable polymer may be a polyolefin (saturated hydrocarbon) main chain, a polyether main chain, a polyurea main chain, a polyurethane main chain, a polyester main chain, a polyamine main chain, a polyamide main chain, or a melamine resin main chain. A polyolefin, polyether, or polyurea main chain is preferred. A polyolefin or polyether main chain is more preferred. A polyolefin main chain is the most preferred.

A polyolefin main chain is composed of a saturated hydrocarbon. A polyolefin main chain is obtained by, for example, addition polymerization of an unsaturated polymerizable group. A polyether main chain is composed of repeating units bonded via an ether linkage (—O—). A polyether main chain is obtained by, for example, ring-opening polymerization of an epoxy group. A polyurea main chain is composed of repeating units bonded via a urea linkage (—NH—CO—NH—). A polyurea main chain is obtained by, for example, polycondensation between an isocyanate group and an amino group. A polyurethane main chain is composed of repeating units bonded via a urethane linkage (—NH—CO—O—), which is obtained by, for example, polycondensation between an isocyanate group and a hydroxyl group (including N-methylol). A polyester main chain is composed of repeating units bonded via an ester linkage (—CO—O—), which is obtained by, for example, polycondensation between a carboxyl group (including an acid anhydride group) and a hydroxyl group (including N-methylol). A polyamine main chain is composed of repeating units bonded via an imino linkage (—NH—). A polyamine main chain is obtained by, for example, ring-opening polymerization of an ethyleneimine group. A polyamide main chain is composed of repeating units via an amide linkage (—NH—CO—). A polyamide main chain is obtained by, for example, the reaction between an isocyanate group and a carboxyl group (including an acid halide group). A melamine resin main chain is obtained by, for example, polycondensation between a triazine ring (e.g., of melamine) and an aldehyde (e.g., formaldehyde). The melamine resin main chain has crosslinkability of itself.

Representative examples of the constituent unit for providing crosslinkability include (A) a unit obtained by polymerizing a monomer having a self-crosslinking functional group, such as glycidyl(meth)acrylate or glycidyl vinyl ether, (B) a unit obtained by polymerizing a monomer having a carboxyl group, a hydroxyl group, an amino group, a sulfo group, etc., such as (meth)acrylic acid, methylol(meth)acrylate, hydroxyalkyl(meth)acrylate, allyl acrylate, hydroxyethyl vinyl ether, hydroxybutyl vinyl ether, maleic acid, or crotonic acid, and (C) a unit obtained by causing a compound having a group reactive with the functional group possessed by the unit (A) or (B) and another crosslinking functional group to react with the unit (A) or (B), such as a unit obtained by causing acrylic acid chloride to react on a hydroxyl group.

The crosslinking functional group possessed by the unit (C) is preferably a photopolymerizable group. Examples of the photopolymerizable group include a (meth)acryloyl group, an alkenyl group, a cinnamoyl group, a cinnamylideneacetyl group, a benzalacetophenone group, a styrylpyridine group, an α-phenylmaleimide, a phenylazide group, a sulfonylazide group, a carbonylazide group, a diazo group, an o-quionediazide group, a furylacryloyl group, a cumarin group, a pyrone group, an anthracene group, a benzophenone group, a stilbene group, a dithiocarbamate group, a xanthate group, a 1,2,3-thiadiazole group, a cyclopropane group, and an azadioxabicyclo group. The compound may have more than one of these polymerizable groups. Preferred of them are (meth)acryloyl and cinnamoyl, with (meth)acryloyl being particularly preferred.

In the case when curability of the monomer or polymer binder alone is insufficient, a crosslinking compound may be used in combination to impart sufficient curability. It is also possible to use only a crosslinking compound to cure along with the slip agent. For example, when the polymer itself has a hydroxyl group, an amino compound of various kinds may be used as a curing agent. An amino compound serving as a crosslinking compound is exemplified by a compound having at least two groups selected from a hydroxyalkylamino group and an alkoxyalkylamino group. Examples of such an amino compound are melamine compounds, urea compounds, benzoguanamine compounds, and glycoluril compounds. Specific examples of these crosslinking compounds are given in JP 2007-298974A, paras. 0179-0183.

Polymerization of the monomer or polymer having an ethylenically unsaturated group is carried out by irradiation with an ionizing radiation or heating in the presence of a photo radical initiator or thermal radical initiator. Polymerization of the monomer having an ethylenically unsaturated group is carried out by irradiation with an ionizing radiation or heating in the presence of a photo radical initiator or thermal radical initiator.

Polymerization of the photopolymerizable polyfunctional monomer is preferably effected using a photopolymerization initiator. The photopolymerization initiator is preferably a radical initiator or a cationic initiator, particularly preferably a radical initiator.

Examples of suitable photo radical initiators include acetophenones, benzoins, benzophenones, phosphine oxides, ketals, anthraquinones, thioxanthones, azo compounds, peroxides (such as disclosed in JP 2001-139663A), 2,3-dialkyldione compounds, disulfide compounds, fluoroamine compounds, aromatic sulfonium compounds, lophine dimers, onium salts, borate salts, active esters, active halogens, inorganic complexes, and cumarins.

The initiators may be used either individually or as a mixture thereof. Various examples of radical initiators useful in the invention are described in *Saishin UV Koka Gijyutsu*, Technical Information Institute, Ltd., 1991, p. 159 and Kato Kiyoshi, *Shigaisen Koka System*, Sogo Gijyutsu Center, 1989, pp. 65-148. Examples of commercially available photo radical initiators that are preferably used in the invention are KAYACURE series (e.g., DETX-S, BP-100, BDMK, CTX, BMS, 2-EAQ, ABQ, CPTX, EPD, ITX, QTX, BTC, and MCA) from Nippon Kayaku Co., Ltd.; IRGACURE series (e.g., 651, 127, 184, 500, 819, 907, 369, 379, 1173, 1870, 2959, 4265, and 4263) from Ciba Specialties Chemicals); and combinations thereof.

A photo sensitizers and a thermal initiator may be used. Specific examples of these compounds are described in JP 2007-298974A, paras. 0190-0219.

The initiator and the sensitizer are preferably used in an amount of 0.1 to 15 parts, more preferably 1 to 10 parts, by mass per 100 parts by mass of the curing monomer or polymer. They may be used either individually or as a combination of two or more thereof.

A compound generating a radical or an acid upon irradiation with an ionizing radiation or heat may be used as a catalyst for accelerating curing. Specific examples of such a compound are described in JP 2007-298974A, paras. 0220-0231.

The curing catalyst is preferably used in an amount of 0.01 to 10 parts, more preferably 0.1 to 5 parts, by mass per 100 parts by mass of the curing resin composition. Specific examples and usage of the curing catalyst are described in JP 2005-43876A.

The solvent that can be used to prepare a coating composition for forming a slip layer is selected from those satisfying the requirements, such as: that every component be soluble or dispersible therein, that the resulting composition be ready to provide a uniform surface condition while being applied and dried, that the composition be preservable, and that the saturation vapor pressure thereof be appropriate. A mixed solvent may be used. From the viewpoint of drying load, it is preferred to use a mixed solvent composed of a solvent having a boiling point lower than 100° C. at atmospheric pressure and at room temperature as a main component and, for drying rate control, a minor proportion of a solvent having a boiling point higher than 100° C.

Examples of the solvent with a boiling point lower than 100° C. include hydrocarbons, such as hexane (boiling point (hereinafter the same)=68.7° C.), heptane (98.4° C.), and benzene (80.1° C.); halogenated hydrocarbons, such as dichloromethane (39.8° C.), chloroform (61.2° C.), carbon tetrachloride (76.8° C.), 1,2-dichloroethane (83.5° C.), and trichloroethylene (87.2° C.); ethers, such as diethyl ether (34.6° C.), diisopropyl ether (68.5° C.), dipropyl ether (90.5° C.), and tetrahydrofuran (66° C.); esters, such as ethyl formate (54.2° C.), methyl acetate (57.8° C.), ethyl acetate (77.1° C.), and isopropyl acetate (89° C.); ketones, such as acetone (56.1° C.) and 2-butanone (=methyl ethyl ketone) (79.6° C.); alcohols, such as methanol (64.5° C.), ethanol (78.3° C.), 2-propanol (82.4° C.), and 1-propanol (97.2° C.); cyano compounds, such as acetonitrile (81.6° C.) and propionitrile (97.4° C.); and carbon disulfide (46.2° C.). Preferred of them are ketones and esters. Ketones are more preferred. 2-Butanone is particularly preferred.

Examples of the solvent with a boiling point, higher than 100° C. include octane (125.7° C.), toluene (110.6° C.), xylene (138° C.), tetrachloroethylene (121.2° C.), chlorobenzene) (131.7°, dioxane (101.3° C.), dibutyl ether (142.4° C.), isobutyl acetate (118° C.), cyclohexane (155.7° C.), 2-methyl-4-pentanone (=methyl isobutyl ketone) (115.9° C.), 1-butanol (117.7° C.), N,N-dimethylformamide (153° C.), N,N-dimethylacetamide (166° C.) and dimethyl sulfoxide (189° C.). Preferred of them are cyclohexanone and 2-methyl-4-pentanone.

It is preferable that at least one of the solvents used in the coating composition be capable of swelling or dissolving the member A or B in terms of enhanced adhesion of the slip layer to the member A or B. The proportion of such a solvent in the mixed solvent is preferably 1% to 100% by mass, more preferably 2% to 30% by mass. The slip agent content in the coating composition for forming the slip layer is preferably 0.1% to 99%, more preferably 0.5% to 50%, even more preferably 1% to 30%, by mass based on the solids content (i.e., non-volatile content). The content of the curing resin is preferably 1% to 99.9%, more preferably 50% to 99.5%, even more preferably 70% to 98%, by mass based on the solids content. The solids content of the composition is preferably 0.1% to 50%, more preferably 0.5 to 25%, even more preferably 1% to 15%, by mass, while varying depending on the coating equipment and the member to be coated. With this solids content, the coating composition will form a thin and highly uniform coating film.

The thickness of the slip layer is not particularly limited as long as the essential performance of the members A and B, e.g., light collecting performance and light diffusing performance are not greatly impaired. To secure sufficient coating with the slip agent to provide sufficient slip properties while retaining good optical characteristics, the thickness is preferably 1 nm or greater and smaller than 1 µm, more preferably 2 nm or greater and smaller than 0.1 µm, even more preferably 3 to 80 nm. While it is not easy to measure the thickness of the slip layer formed on the surface with recesses, it is desirable that the mass of the slip layer provided per unit projected area (unit area of the substrate seen from the direction normal to the substrate) correspond to a preferred thickness recited.

After the coating composition applied is dried to remove the solvent, the coating layer is subjected to curing if necessary. The ionizing radiations to be applied to a layer containing an ionizing radiation curing material are not particularly limited and include X-rays, electron rays, ultraviolet rays, visible rays, and infrared rays. Ultraviolet rays are widely used. For example, curing of a UV-curing coating layer is preferably achieved by irradiation with a total of 10 to 1000 mJ/cm$^2$ UV light from a UV lamp either at a time or in divided doses. The temperature of the layer being irradiated is usually 20° to 200° C., preferably 30° to 150° C., more preferably 40° to 120° C., in terms of handling properties and in-plane performance uniformity. At temperatures of 200° C. and lower, any low molecular component in the binder is prevented from fluidizing to deteriorate the surface conditions, and thermal damage to the substrate is avoided. At temperatures of 20° C. and higher, the curing reaction proceeds sufficiently to provide a film with good scratch resistance.

The oxygen concentration in the atmosphere during irradiation is preferably 3% or lower, more preferably 1% or lower, even more preferably 0.1% or lower, by volume.

In the case of using a thermally curing binder, the curing temperature is preferably 60° to 200° C., more preferably 80° to 130° C., even more preferably 80° to 110° C. Low temperatures are preferred when the substrate is susceptible to deterioration due to high temperature. The heating time for thermal cure is preferably 30 seconds to 60 minutes, more preferably 1 to 20 minutes.

In a second preferred embodiment for incorporating a slip agent to the surface region of the member A or B, a slip agent is added to a curing material used to make the light collection portions (prism or cylindrical lens array of the member A). In this embodiment, the same curing resin, polymerization initiator, and crosslinking agent as described above with respect to the first preferred embodiment may be used. Of the curing resins described, in particular, urethane (meth)acrylate compounds and (meth)acrylic ester compounds are preferred in terms of heat resistance, scratch resistance, and resistance to yellowing on exposure to light. Examples of these compounds are described in JP 2009-47899A, paras. 0042-0077. The amount of the slip agent to be incorporated is preferably 0.1% to 10%, more preferably 0.3% to 5%, even more preferably 0.3 to 3%, by mass based on the curing resin forming the prisms or cylindrical lenses.

In the embodiment in which the slip layer is formed on the member A and/or the member B, the preferred ranges of the surface profile parameters and optical characteristic values of the member(s) are the same as those described with respect to the individual members A and B.

Although the surface light source unit according to the embodiment illustrated in FIG. 1 has the diffuser sheet 18, the diffuser sheet 18 is not essential to the surface light unit of the invention and may be omitted.

A polarizing film (or simply "polarizer") is generally covered with a protective film to make a polarizing plate, which is used in various applications such as image display devices. For the purpose of decreasing the number of parts making up an image display device thereby to reduce the total thickness of the device, the light transmissive substrate of the invention (i.e., the member B) is advantageously used as the protective film of a polarizing plate. The side of the protective film to be bonded to a polarizer may be subjected to surface treatment to enhance adhesion to the polarizer. Useful surface treatments include corona discharge treatment, glow discharge treatment, flame treatment, acid treatment, alkali treatment (i.e., saponification), and UV irradiation. In the cases when the protective film contains a cellulose acylate as a main component, it is preferably subjected to saponification treatment.

Any polarizer may be used with no restriction. Coated-type polarizers such as available from Optiva Inc. or polarizers containing a binder and iodine or a dichroic colorant are preferred.

The side of the polarizer opposite to the light transmissive substrate is preferably covered with another protective film. The protective film opposite to the light transmissive substrate is preferably a cellulose acylate film, a norbornene resin film, or a polycarbonate film.

An adhesive may be used to bond the light transmissive substrate (B member) to the polarizer, including a polyvinyl alcohol resin adhesive (including an acetoacetyl-, sulfo-, carboxyl-, or oxyalkylene-modified polyvinyl alcohol) and a boron compound aqueous solution adhesive. A polyvinyl alcohol resin adhesive is preferred. The dry thickness of the adhesive is preferably 0.01 to 10 μm, more preferably 0.05 to 5 μm.

The polarizing plate of the invention may have another layer with any function other than light diffusion, such as an optical compensation layer for compensating for the birefringence of a liquid crystal cell, an antireflective layer, an antiglare layer, a hardcoat layer, or an antistatic layer.

A preferred embodiment of the polarizing plate of the invention has an optical compensation film having an optically anisotropic layer as at least one of the protective films. The optical compensation film (retardation film) provides improved viewing angle characteristics of liquid crystal display.

The present invention will now be illustrated in greater detail with reference to Examples.

EXAMPLES

1. Preparation of Light Collecting Sheet (Member A)

1-1. Preparation of Prism Sheets P-1 and P-2

A polycarbonate resin was melt extruded to obtain prism sheets P-1 and P-2 having an array of prisms each having an isosceles triangular cross-section on its light emitting side. Prism sheet P-1 had a thickness (distance from the valley of prisms to the reverse side) of 125 μm, a prism apex angle of 90°, and a prism pitch (Pa) of 110 μm. Prism sheet P-2 had the same geometry as P-1, except for having the pitch Pa of 200 p.m.

1-2. Preparation of Prism Sheets P-101 to P-103

A curing composition having the formulation shown in Table 1 below was applied to a 80 μm thick polyethylene terephthalate film, press embossed, and photo cured to make a prism sheet, designated P-101, P-102, or P-103, having the same geometry as prism sheet P-1.

TABLE 1

| Curing Composition | Prism Sheet No. | | |
|---|---|---|---|
| (part by mass) | P-101 | P-102 | P-103 |
| Pentaerythritol triacrylate | 10 | 7 | 7 |
| Urethane acrylate (Cpd-1[*1]) | 36 | 36 | 36 |
| Polybutylene glycol dimethacrylate (Cpd-2[*2]) | 45 | 50 | 50 |
| Phenyl methacrylate | 6 | 6 | 6 |
| Photopolymerization initiator (Irg127[*3]) | 3 | 3 | 3 |
| Slipagent (curing silicone A[*4]) | — | 3 | — |
| Slipagent (curing fluoropolyether[*5]) | — | — | 3 |

[*1]Cpd-1: Compound (4) in JP 2009-47899A
[*2]Cpd-2: A mixture consisting of butylene glycol dimethacrylate homopolymers having average degrees of polymerization of from 5 to 10.
[*3]Irg127: Irgacure 127, from Ciba Specialties Chemicals
[*4]Curing silicone A: Bi-terminal methacrylate-modified dimethylsiloxane (Silaplane FM-7725 from Chisso; average molecular weight: 10,000)
[*5]Curing fluoropolyether: Fluoropolyether-containing polyfunctional acrylate (compound C-3 in JP 2007-114772A).

2. Preparation of Light Transmissive Substrate (Member B)

Dopes were prepared in accordance with the compositions (part by mass) shown in Table 2.

TABLE 2

| | | Dope No. | | | | | | | | |
|---|---|---|---|---|---|---|---|---|---|---|
| Composition (part by mass) | | 001 | 002 | 003 | 004 | 005 | 006 | 007 | 008 | 009 |
| Solid Component | Cellulose triacetate A[*1] | 90 | 90 | 90 | 90 | 90 | — | — | 90 | 90 |
| | Cellulose triacetate B[*2] | — | — | — | — | — | 90 | 90 | — | — |
| | Plasticizer[*3] | 10 | 10 | 10 | 10 | 10 | 10 | 10 | 10 | 10 |
| Solvent System[*4] | Dichloromethane (9) | 92 | 90.6 | 90.1 | 91.1 | 91.6 | 92 | 90.2 | 91.8 | 60 |
| | Methanol (33) | 8 | 7.9 | 7.9 | 7.9 | 7.9 | 8 | 7.8 | 8 | 8 |
| | Water (78) | — | 1.5 | 2 | 1 | 0.5 | — | 2 | 0.2 | 32 |

[*1]Cellulose triacetate A: Degree of acetyl substitution: 2.94; viscosity average degree of polymerization: 300; degree of acetyl substitution at the 6-position: 0.94
[*2]Cellulose triacetate B: Degree of acetyl substitution: 2.86; viscosity average degree of polymerization: 310; degree of acetyl substitution at the 6-position: 0.89
[*3]A condensate between ethanediol and adipic acid (1:1 by mole), number average molecular weight: 1000
[*4]The numbers in the parentheses are dielectric constants.

All the compositions of the dopes were designed to have a solids concentration of 17 mass %. In the preparation of dope sample No. 009, the polymer did not dissolve, resulting in a failure to provide a casting dope.

The dope (cellulose acylate solution) or two dopes shown in Table 3 was/were each heated to 30° C. and cast or co-cast through a casting head (disclosed in JP 11-314233A) on a 60 m long, mirror-finished stainless steel endless belt set at 15° C. and moving at a speed of 50 m/min with a coating width of 200 cm. The environmental spatial temperature of the whole casting zone was set at 15° C. The cellulose acylate web thus formed on the belt was stripped when its leading end was 50 cm short of the casting head, dried by applying 45° C. dry air, and further dried at 110° C. for 5 minutes and then at 140° C. for 10 minutes to obtain a cellulose acylate film. In the case of co-casting two dopes, a feed block die was used. In Table 3, the term "basal layer" denotes the layer cast directly on the support. The thus obtained light transmissive substrates were designated F-1 through F-11.

3. Evaluation of Light Transmissive Substrate

A sample was cut out of the central portion of the resulting continuous web of the light transmissive substrate. The sample film was observed using a 3D non-contact type profilometer Micromap MM5000 from Ryoka Systems Inc. to determine the depth, opening length, opening breadth, center-to-center distance, and number of recesses per $mm^2$ of the film surface. The optical properties (haze, total light transmittance, and parallel light transmittance) of the resulting substrate were determined using a hazemeter NDH 2000 from Nippon Denshoku Kogyo KK. The results obtained are shown in Table 3.

The opening of the recesses was nearly circular with an equivalent circle diameter (projected area diameter) of about 5 to 16 μm as viewed vertically from above. The shape of the bottom of the recesses was nearly circular with an equivalent circle diameter (projected area diameter) of about 3 to 10 μm as viewed vertically from above. The bottom of the recesses had a width corresponding to 60% to 70% of the width of the opening of the recesses in a cross-sectional view. The slope of the bottom relative to the surface of the substrate was within ±2.5°. The inner wall of the recesses had a gradually increasing curvature radius from the bottom to the opening edge. All the film samples had an internal porosity of not more than 1% by volume. The dimensional change of the recesses was 0.5% or less as measured by the method described infra at a temperature higher than the glass transition temperature of the cellulose acylate.

The substrate prepared using dope No. 008 in the same manner as for substrate F-1 was found to have no recesses on its surface similarly to substrate F-1.

TABLE 3

Characteristics of Light Transmissive Substrate

| | Dope No. | | Thickness (μm) | | Geometry of Recesses | | | | | | Optical Properties | | |
|---|---|---|---|---|---|---|---|---|---|---|---|---|---|
| | | | | | | Length | | Center-to-center | | | | Total | Parallel |
| Substrate No. | Basal Layer | Surface Layer | Basal Layer | Surface Layer | Depth (μm) | Lb (μm) | Breadth (μm) | Distance (μm) | Number/$mm^2$ | Sd/Sa (%) | Haze (%) | Transmittance (%) | Transmittance (%) |
| F-1 | 001 | — | 80 | — | — | — | — | — | — | — | 0 | 93 | 93 |
| F-2 | 002 | — | 80 | — | 3.1 | 15.9 | 15.2 | 17.0 | 3500 | 66 | 92 | 90 | 7 |
| F-3 | 003 | — | 80 | — | 3.0 | 10.5 | 10.0 | 14.2 | 5010 | 41 | 90 | 90 | 9 |
| F-4 | 004 | — | 80 | — | 2.7 | 8.7 | 8.0 | 18.3 | 2900 | 16 | 80 | 90 | 18 |
| F-5 | 005 | — | 80 | — | 2.4 | 7.0 | 6.1 | 22.4 | 1990 | 7 | 65 | 91 | 32 |
| F-6 | 001 | 002 | 30 | 50 | 1.8 | 6.5 | 6.0 | 36.0 | 1100 | 3.4 | 61 | 92 | 36 |
| F-7 | 001 | 002 | 55 | 25 | 1.7 | 5.2 | 4.8 | 40.0 | 480 | 0.9 | 20 | 92 | 74 |
| F-8 | 002 | — | 40 | — | 3.0 | 15.9 | 15.2 | 16.9 | 3550 | 67.4 | 95 | 88 | 5 |
| F-9 | 006 | — | 80 | — | — | — | — | — | — | — | 0 | 93 | 93 |
| F-10 | 007 | — | 80 | — | 3.2 | 16.0 | 15.1 | 17.0 | 3600 | 68.3 | 91 | 92 | 8 |
| F-11 | 006 | 007 | 40 | 40 | 1.7 | 5.2 | 4.8 | 33.0 | 900 | 1.8 | 42 | 92 | 53 |

4. Preparation of Coating Composition for Slip Layer

Coating compositions S-201 to S-205 were prepared according to the solids formulations shown in Table 4. A 10:90 (by mass) mixture of methyl ethyl ketone and methyl isobutyl ketone was used as a diluting solvent to result in a solids concentration of 5 mass %.

TABLE 4

| Solids Formulation | | Designation of Coating Composition | | | | |
|---|---|---|---|---|---|---|
| (part by mass) | | S-201 | S-202 | S-203 | S-204 | S-205 |
| PET-30*[1] | | 11 | 11 | 11 | 11 | — |
| DPHA*[2] | | 80 | 80 | 80 | 80 | — |
| Cymel 303*[3] | | — | — | — | — | 92 |
| Photopolymerization Initiator (Irg127) | | 5 | 5 | 5 | 5 | 5 |
| Curing Catalyst (Catalyst 4050*[4]) | | — | — | — | — | 4 |
| Slip Agent | curing silicone A*[5] | 4 | — | 2 | — | — |
| | curing silicone B*[6] | — | 4 | 2 | — | — |
| | curing fluoro-polyether*[7] | — | — | — | 3 | — |
| | curing silicone C*[8] | — | — | — | — | 4 |

*[1]PET-30: Mixture of pentaerythritol triacrylate and pentaerythritol tetraacrylate, available from Nippon Kayaku Co., Ltd.
*[2]DPHA: Mixture of dipentaerythritol hexaacrylate and dipentaerythritol pentaacrylate, from Nippon Kayaku Co., Ltd.
*[3]Cymel 303: Thermosetting methylolmelamine compound, from Japan Cytec Industries, Inc.
*[4]Catalyst 4050: Amine-blocked toluenesulfonic acid, from Japan Cytec Industries, Inc.
*[5]Curing silicone A: Bi-terminal methacrylate-modified dimethylsiloxane (Silaplane FM-7725 from Chisso; average molecular weight: 10,000)
*[6]Curing silicone B: Dimethylsiloxane unit-containing copolymer having two or more acrylate moieties per molecule; average molecular weight: 45000 (copolymer P-7 in JP 2008-106090A).
*[7]Curing fluoropolyether: Fluoropolyether-containing polyfunctional acrylate (compound C-3 in JP 2007-114772A).
*[8]Curing silicone C:

5. Preparation of Light Transmissive Substrate Having Slip Layer

Each of the coating compositions of Table 4 was applied to the recessed side of the substrate F-3 (see Table 3) using a slot die coater described in FIG. 1 of JP 2003-211052A to a dry thickness of 70 nm. The coating layer was dried successively at 30° C. for 15 seconds and at 90° C. at 20 seconds and then cured under the following conditions. The coating layers formed of compositions S-102 to S-204 were irradiated with 500 mJ/cm$^2$ UV light using a 160 W/cm air-cooled metal halide lamp from Eye Graphics Co., Ltd. in a nitrogen-purged atmosphere with an oxygen concentration of 0.1% or less. The coating layer formed of composition S-205 was heat treated at 110° C. for 10 minutes. The thickness of the slip layer recited above was a value calculated from the amount of the solids content applied assuming that the coating composition was applied to a smooth surface to a uniform thickness. It was confirmed that the formation of the slip layer brought about no substantial changes in the geometry of recesses and optical properties of the substrate as evaluated above and summarized in Table 3.

The resulting light transmissive substrates having a slip layer were designated F-3/S-201, F-3/S-202, F-3/S-203, F-3/S-204, and F-3/S-205. The surface of the resulting substrates was analyzed by ESCA to obtain the following results, which proved the presence of Si or F originated in the slip agent.

F-3/S-201: Si/C=0.49 (elemental molar ratio)
F-3/S-202: Si/C=0.48 (elemental molar ratio)
F-3/S-203: Si/C=0.49 (elemental molar ratio)
F-3/S-204: F/C=2.3 (elemental molar ratio)
F-3/S-205: Si/C=0.49 (elemental molar ratio)

6. Preparation of Comparative Diffusing Members H-1 to H-3

Figure 5:
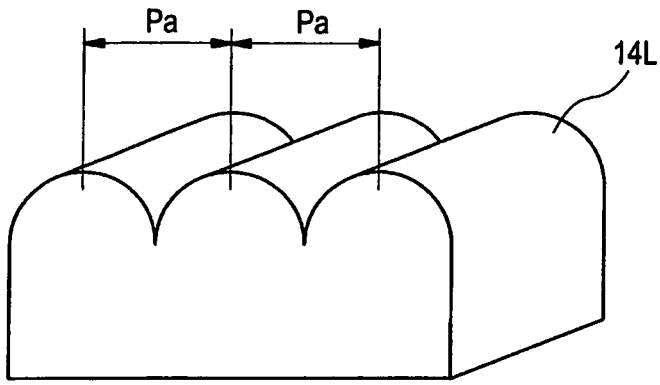
FIG. 5 is a partial enlarged view of the light collecting sheet of FIG. 4.

Coating compositions for light diffusing layer were prepared in accordance with the formulations of FIG. 5. Each coating composition was applied to an 80 μm thick triacetyl cellulose film TAC-TD80U from Fujifilm Corp., dried at 90° C. for 40 seconds, and irradiated with 50 mJ/cm$^2$ UV light from a 160 W/cm air-cooled metal halide lamp from Eye Graphics Co., Ltd. under nitrogen purge to form a 5.0 μm thick cured film as a light diffusive hardcoat. The hardcoat was found to have a rough surface. The haze, total light transmittance, and parallel light transmittance of the resulting diffusing members were measured with a hazemeter (NDH2001 manufactured by Nippon Denshoku Kogyo KK). The Ra (arithmetic average roughness) and Sm (mean spacing between adjacent profile peaks) of the surface of the hardcoat were determined in accordance with JIS B0601 (1982). The Sm was determined using Surfcorder SE-23F from Osaka Laboratory Ltd. The results are shown in Table 5.

TABLE 5

| | Comparative Diffusing Member | | |
|---|---|---|---|
| | H-1 | H-2 | H-2 |
| Coating Composition (part by mass): | | | |
| PET-30 | 35 | 35 | 35 |
| DPHA | 3.0 | 3.0 | 3.0 |
| Photopolymerization Initiator (Irg127) | 2.0 | 2.0 | 2.0 |
| Agglomerated Silica (avg. secondary particle size: 1.5 μm) | 4.0 | 3.0 | 1.5 |
| Crosslinked Styrene Particles (3.5 μm) | 1.3 | 1.0 | 0.5 |
| Crosslinked Acrylic/styrene Copolymer Particles (3.5 μm) | 8 | 6.0 | 3 |
| MIBK | 40 | 40 | 40 |
| Cyclohexanone | 10 | 10 | 10 |
| Physical Properties of Diffusing Member: | | | |
| Haze (%) | 61 | 42 | 20 |
| Total Light Transmittance (%) | 49 | 59 | 79 |
| Parallel Light Transmittance (%) | 19 | 34 | 63 |
| Ra (μm) | 0.24 | 0.20 | 0.17 |
| Sm (μm) | 45 | 51 | 61 |

7. Evaluation in Application to LCD

A notebook computer R700-XP50K WXGA+ from LG Display Co., Ltd. (pixel count: 1440×900, 17 in.) was disassembled. The diffuser sheet between the backlight and the liquid crystal panel was removed, the backlight side protective film of the backlight side polarizing plate was stripped off and replaced with each of the B members shown in Table 6, and the two prism sheets in the backlight unit were replaced with the member A shown in Table 6.

The following evaluations were carried out using the thus modified LCDs. The results of evaluations are shown in Table 6.

(1) Front White Brightness

Signals were input to the LCD using a video signal generator VG-848 from Astrodesign to provide a white display at the 256th gradation level. The front luminance of the display was measured from the normal to the display screen in a dark room using a luminance meter BM5-A from Topcon. The measurement was made at 5 positions: at the center of the screen, 3 cm above and below the center, and 3 cm left and right from the center to obtain an average. The luminance was expressed relatively taking that of the LCD having the substrate F-1 with no light diffusing properties as the protective film of the backlight side polarizing plate as a standard (100%) and graded according to the following criteria in terms of reduction from the standard.

A: No or little reduction (98% to 100%)
B: Slight reduction (95% or more and less than 98%)
C: Reduction (less than 95%)

(2) Brightness Nonuniformity

Signals were input to the LCD using a video signal generator VG-848 from Astrodesign to provide a gray display at the 128th gradation level. The front luminance of the display was measured from the normal to the surface of the display screen in a dark room using a luminance meter BM5-A from Topcon. The measurement was made at the center of the screen and every 0.5 cm up to 8 cm from the center to the left and to the right. The brightness nonuniformity was quantitatively represented by [difference between maximum and minimum luminances among the measurements within 3 cm]/[average luminance of the measurements within 3 cm]×100(%). A brightness nonuniformity of 3% or less is unrecognizable by most people. A brightness nonuniformity of more than 3% and not more than 6% is recognizable by some people. A brightness nonuniformity of more than 10% is recognizable by most people. A brightness nonuniformity of not more than 10% is required for selling.

(3) Moire

A gray solid display at the 128th gradation level was produced in the same manner as in (2) above. Four evaluators visually observed the display screen from various angles in a dark room to rank the degree of moire as follows.
A: No moire observed.
B: Slight moire observed, almost non-annoying.
C: Moire observed to a slightly annoying degree.
D: Moire observed obviously.

The highest and lowest ratings given to each LCD were discarded, and the remaining ratings by two evaluators were adopted for evaluation. When the two evaluators gave different ratings, both the ratings were described in Table 6. For example, rating "BC" means that one evaluator rated B while the other rated C. Rating B or higher is required for practical use.

(4) Scratch Resistance

Each of the members A was fixed on a smooth surface of a glass plate with its prismed surface up. A 20 mm by 20 mm piece cut out of the member B was placed on the member A with its uneven surface side down. The upper side of the member B was fixed to the head of a scratch tester with a piece of an eraser (MONO, from Tombow Pencil Co., Ltd.) having a bottom of 20 mm by 20 mm and a thickness of 10 mm put therebetween, and a downward load of 100 g/cm² was applied thereto. The head was oscillated 200 times at a speed of 1.8 cm/s and a stroke length of 3.5 cm under conditions of 25° C., 60% RH. The first 100 to-and-fro movements were made in the direction parallel to the prism axis, and the next 100 to-and-fro movements were in the perpendicular direction. After the scratch test, the degree of scratch damage of the member A was inspected microscopically and graded A to F according to the area and frequency of the scratches as follows.
A: No scratches are observed even under very careful observation.
B: Only under very careful observation can a small scratch be found.
C: A small scratch is observed.
D: A medium size scratch is observed.
E: A large scratch is observed.
F: Large scratches are observed at a high frequency.

When the member A having been damaged and graded E or F in the scratch test was incorporated into an LCD in the same manner as described above, the scratch damage was recognized as a white-spot defect. In the case of the member A graded although a few white spots were observed, they were acceptable for practical use.

TABLE 6

| Sample No. | Member A | Member B | Pa/Lb | Front Brightness | Brightness Uniformity | Moire | Scratch Resistance | Remark |
|---|---|---|---|---|---|---|---|---|
| BLU-01 | P-1 | F-1 | — | A | 14 | D | C | comparison |
| BLU-02 | P-1 | F-2 | 6.9 | B | 3 | A | B | invention |
| BLU-03 | P-1 | F-3 | 10.5 | B | 3 | A | B | invention |
| BLU-04 | P-1 | F-4 | 12.6 | B | 4 | A | B | invention |
| BLU-05 | P-1 | F-5 | 15.7 | A | 4 | A | B | invention |
| BLU-06 | P-1 | F-6 | 16.9 | A | 6 | A | B | invention |
| BLU-07 | P-1 | F-7 | 21.2 | A | 9 | B | B | invention |
| BLU-08 | P-1 | F-8 | 6.9 | B | 3 | A | B | invention |
| BLU-09 | P-1 | F-9 | — | A | 14 | D | C | comparison |
| BLU-10 | P-1 | F-10 | 6.9 | A | 3 | A | B | invention |
| BLU-11 | P-1 | F-11 | 21.2 | A | 7 | AB | B | invention |
| BLU-12 | P-1 | H-1 | — | C | 6 | A | E | comparison |
| BLU-13 | P-1 | H-2 | — | C | 7 | AB | E | comparison |
| BLU-14 | P-1 | H-3 | — | C | 9 | B | E | comparison |
| BLU-15 | P-1 | F-3/S-201 | 10.5 | B | 3 | A | A | invention |
| BLU-16 | P-1 | F-3/S-202 | 10.5 | B | 3 | A | A | invention |
| BLU-17 | P-1 | F-3/S-203 | 10.5 | B | 3 | A | A | invention |
| BLU-18 | P-1 | F-3/S-204 | 10.5 | B | 3 | A | A | invention |
| BLU-19 | P-1 | F-3/S-205 | 10.5 | B | 3 | A | A | invention |
| BLU-20 | P-101 | F-3 | 10.5 | B | 3 | A | C | invention |
| BLU-21 | P-102 | F-3 | 10.5 | B | 3 | A | B | invention |
| BLU-22 | P-103 | F-3 | 10.5 | B | 3 | A | B | invention |
| BLU-23 | P-101 | F-3/S-201 | 10.5 | B | 3 | A | A | invention |
| BLU-24 | P-2 | F-1 | — | A | 16 | D | D | comparison |
| BLU-25 | P-2 | F-2 | 12.6 | B | 3 | A | C | invention |
| BLU-26 | P-2 | F-3 | 19.0 | B | 4 | A | C | invention |
| BLU-27 | P-2 | F-4 | 23.0 | B | 4 | A | C | invention |
| BLU-28 | P-2 | F-5 | 28.6 | A | 4 | A | C | invention |
| BLU-29 | P-2 | F-6 | 30.8 | A | 6 | A | C | invention |
| BLU-30 | P-2 | F-11 | 38.5 | A | 7 | AB | C | invention |
| BLU-31 | P-2 | F-7 | 38.5 | A | 9 | B | C | invention |
| BLU-32 | P-2 | H-1 | — | C | 6 | A | E | comparison |
| BLU-33 | P-2 | H-2 | — | C | 7 | B | E | comparison |
| BLU-34 | P-2 | H-3 | — | C | 9 | BC | E | comparison |
| BLU-35 | P-2 | F-3/S-201 | 19.0 | B | 4 | A | A | invention |
| BLU-36 | P-2 | F-3/S-202 | 19.0 | B | 4 | A | A | invention |
| BLU-37 | P-2 | F-3/S-203 | 19.0 | B | 4 | A | A | invention |
| BLU-38 | P-2 | F-3/S-204 | 19.0 | B | 4 | A | B | invention |
| BLU-39 | P-2 | F-3/S-205 | 19.0 | B | 4 | A | B | invention |

The results in Table 6 prove that the surface light source unit of the invention having a combination of a light collecting sheet and the light transmissive substrate with recesses on its surface according to the invention achieves high front brightness, excellent uniformity of brightness, high scratch resistance, and reduced moire.

It is seen that the configurations having the light transmissive substrates with a haze of 60% or higher (F-2 through F-6, F-8, and F-11) are particularly superior in brightness uniformity and reduction of moire and that the configurations having a slip agent incorporated into the light collecting sheet or light transmissive substrate are superior in scratch resistance. Although scratch resistance tends to deteriorate as the pitch of the prisms increases (from the pitch of P-1 to that of P-2), incorporation of the slip agent was proved to improve the scratch resistance to a sufficient level.

Comparing the comparative diffusing members having particles dispersed in a curd resin and therefore having a rough surface (H-1, H-2, and H-3) with the light transmissive substrates of the invention having the same hazes as those of the comparative diffusing members, i.e., F-6, F-11, and F-7, respectively, the comparative members were inferior in terms of front brightness, moire, and scratch resistance. In the case of using a substrate with a flat surface (no recesses), i.e., F-1 or F-9, the scratch resistance was poor, indicating that the surface profile composed of a flat portion and recesses is effective in improving scratch resistance.

It has now proved by the foregoing Examples that the effects of the invention are achieved by the special surface profile of the light transmissive substrate consisting of a flat portion and recesses.

What is claimed is:

1. A method for producing a light transmissive substrate having a flat portion and recesses on at least one side of the substrate, comprising:
    making a light transmissive substrate having a flat portion and recesses on at least one side of the substrate; and
    forming a layer containing at least a slip agent on the side of the substrate with the recesses,
    the making of a light transmissive substrate comprising:
        casting a polymer solution containing at least a thermoplastic resin and a solvent on a support to form a web, stripping the web from the support and drying the web, the polymer solution containing two or more solvents at least one of which has a dielectric constant of 35 or higher, and
        with phase separation between the thermoplastic resin and the at least one solvent having a dielectric constant of 35 or higher in the solution during film formation or while the solvents evaporate after the film formation.

2. The method according to claim 1, wherein the polymer solution contains the solvent having a dielectric constant of 35 or higher in an amount of 0.3% to 30% by mass with respect to a total mass of the solvents.

3. The method according to claim 1, wherein the polymer solution contains a solvent having a dielectric constant of 2 or more and less than 10 and a solvent having a dielectric constant of 10 or more and less than 35.

4. The method according to claim 1, wherein the polymer solution comprises two or more polymer solutions having different compositions, at least one of which solutions contains a solvent having a dielectric constant of 35 or more, a solvent having a dielectric constant of 2 or more and less than 10, and a solvent having a dielectric constant of 10 or more and less than 35, and the casting is carried out by casting the polymer solutions simultaneously or sequentially.

5. The method according to claim 1, wherein the light transmissive substrate has substantially no voids in an inside thereof.

6. The method according to claim 1, wherein the layer containing a slip agent is formed from a composition containing a slip agent having at least one of an ionizing radiation-curing functional group and a thermosetting functional group and at least one of an ionizing radiation-curing compound and a thermosetting compound.

\* \* \* \* \*